United States Patent
Bergeal et al.

(10) Patent No.: US 10,279,314 B2
(45) Date of Patent: *May 7, 2019

(54) OXIDATION CATALYST FOR TREATING THE EXHAUST GAS OF A COMPRESSION IGNITION ENGINE

(71) Applicant: Johnson Matthey Public Limited Company, London (GB)

(72) Inventors: David Bergeal, Royston (GB); Andrew Francis Chiffey, Royston (GB); John Benjamin Goodwin, Royston (GB); Daniel Hatcher, Royston (GB); Francois Moreau, Royston (GB); Agnes Raj, Royston (GB); Raj Rao Rajaram, Reading (GB); Paul Richard Phillips, Royston (GB); Cathal Prendergast, Royston (GB)

(73) Assignee: Johnson Matthey PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,745

(22) Filed: Dec. 12, 2016

(65) Prior Publication Data

US 2017/0087512 A1    Mar. 30, 2017

Related U.S. Application Data

(63) Continuation of application No. 14/691,104, filed on Apr. 20, 2015, now Pat. No. 9,527,034, which is a
(Continued)

(30) Foreign Application Priority Data

Nov. 21, 2012  (GB) .................................. 1220912.8
May 17, 2013  (GB) .................................. 1308934.7

(51) Int. Cl.
    *B01J 23/58*   (2006.01)
    *B01J 21/04*   (2006.01)
    (Continued)

(52) U.S. Cl.
    CPC ........... *B01D 53/944* (2013.01); *B01D 53/62* (2013.01); *B01D 53/922* (2013.01);
    (Continued)

(58) Field of Classification Search
    CPC ... B01J 23/58; B01J 21/04; B01J 21/08; B01J 21/10; B01J 21/12; B01D 53/945; F01N 3/021; F01N 3/2885
    See application file for complete search history.

(56) References Cited

U.S. PATENT DOCUMENTS 5,643,542  A    7/1997  Leyrer et al.
6,338,831  B1   1/2002  Strehlau et al.
(Continued)

FOREIGN PATENT DOCUMENTS

EP   1710009 A1  10/2006
GB   1453710     10/1976
(Continued)

*Primary Examiner* — Cam N. Nguyen
(74) *Attorney, Agent, or Firm* — Gary D. Mangels

(57) ABSTRACT

An exhaust system for a compression ignition engine comprising an oxidation catalyst for treating carbon monoxide (CO) and hydrocarbons (HCs) in exhaust gas from the compression ignition engine, wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component; and a substrate, wherein the platinum group metal (PGM) component, the alkaline earth metal component and the support material are disposed on the substrate.

20 Claims, 1 Drawing Sheet

Related U.S. Application Data continuation of application No. 14/086,019, filed on Nov. 21, 2013, now Pat. No. 9,034,286.

(60) Provisional application No. 61/728,834, filed on Nov. 21, 2012.

(51) Int. Cl.

| | | |
|---|---|---|
| *B01J 21/08* | (2006.01) | |
| *B01J 21/10* | (2006.01) | |
| *B01J 21/12* | (2006.01) | |
| *B01D 53/94* | (2006.01) | |
| *F01N 3/021* | (2006.01) | |
| *F01N 3/28* | (2006.01) | |
| *F01N 3/20* | (2006.01) | |
| *B01J 37/02* | (2006.01) | |
| *F01N 3/10* | (2006.01) | |
| *B01J 35/00* | (2006.01) | |
| *B01J 23/00* | (2006.01) | |
| *B01J 29/74* | (2006.01) | |
| *B01J 23/44* | (2006.01) | |
| *B01J 35/04* | (2006.01) | |
| *B01J 23/42* | (2006.01) | |
| *B01D 53/62* | (2006.01) | |
| *B01D 53/92* | (2006.01) | |
| *F01N 3/035* | (2006.01) | |
| *B01J 35/02* | (2006.01) | |
| *B01J 37/00* | (2006.01) | |
| *B01J 23/63* | (2006.01) | |

(52) U.S. Cl.
CPC ....... *B01D 53/945* (2013.01); *B01D 53/9468* (2013.01); *B01D 53/9472* (2013.01); *B01D 53/9477* (2013.01); *B01J 21/04* (2013.01); *B01J 21/10* (2013.01); *B01J 21/12* (2013.01); *B01J 23/002* (2013.01); *B01J 23/005* (2013.01); *B01J 23/42* (2013.01); *B01J 23/44* (2013.01); *B01J 23/58* (2013.01); *B01J 29/7415* (2013.01); *B01J 35/0006* (2013.01); *B01J 35/04* (2013.01); *B01J 37/0205* (2013.01); *B01J 37/0215* (2013.01); *B01J 37/0244* (2013.01); *B01J 37/0246* (2013.01); *B01J 37/0248* (2013.01); *F01N 3/035* (2013.01); *F01N 3/103* (2013.01); *F01N 3/20* (2013.01); *F01N 3/2807* (2013.01); *F01N 3/2828* (2013.01); *B01D 2255/1021* (2013.01); *B01D 2255/1023* (2013.01); *B01D 2255/204* (2013.01); *B01D 2255/2042* (2013.01); *B01D 2255/2047* (2013.01); *B01D 2255/2065* (2013.01); *B01D 2255/2092* (2013.01); *B01D 2255/20715* (2013.01); *B01D 2255/30* (2013.01); *B01D 2255/50* (2013.01); *B01D 2255/502* (2013.01); *B01D 2255/902* (2013.01); *B01D 2255/908* (2013.01); *B01D 2255/9022* (2013.01); *B01D 2255/9032* (2013.01); *B01D 2255/912* (2013.01); *B01D 2255/915* (2013.01); *B01D 2255/9155* (2013.01); *B01D 2258/012* (2013.01); *B01J 23/63* (2013.01); *B01J 35/023* (2013.01); *B01J 37/0036* (2013.01); *B01J 37/0234* (2013.01); *B01J 2523/00* (2013.01); *F01N 2370/02* (2013.01); *F01N 2510/0684* (2013.01); *Y02A 50/2322* (2018.01); *Y02A 50/2341* (2018.01); *Y10S 502/524* (2013.01); *Y10S 502/52712* (2013.01); *Y10S 502/52713* (2013.01)

(56) References Cited

U.S. PATENT DOCUMENTS

| | | |
|---|---|---|
| 6,858,193 B2 | 2/2005 | Ruwisch et al. |
| 7,998,424 B2 | 8/2011 | Bergeal et al. |
| 8,252,258 B2 | 8/2012 | Mueller-Stach et al. |
| 8,329,607 B2 | 12/2012 | Kazi et al. |
| 8,397,488 B2 | 3/2013 | Woerz et al. |
| 8,637,426 B2 | 1/2014 | Hoke et al. |
| 8,802,016 B2 | 8/2014 | Grubert |
| 8,858,904 B2 | 10/2014 | Punke et al. |
| 2010/0180581 A1 | 7/2010 | Grubert et al. |
| 2011/0305612 A1 | 12/2011 | Mueller-Stach et al. |

FOREIGN PATENT DOCUMENTS

| | | |
|---|---|---|
| JP | H08192030 A | 7/1996 |
| JP | 2006272288 A | 10/2006 |
| JP | 2011092933 A | 5/2011 |
| RU | 2395341 C1 | 7/2010 |
| WO | 2004025096 A1 | 3/2004 |
| WO | 2012085572 A2 | 6/2012 |
| WO | 2014026203 A2 | 2/2014 |
| WO | 2014072504 A1 | 5/2014 |

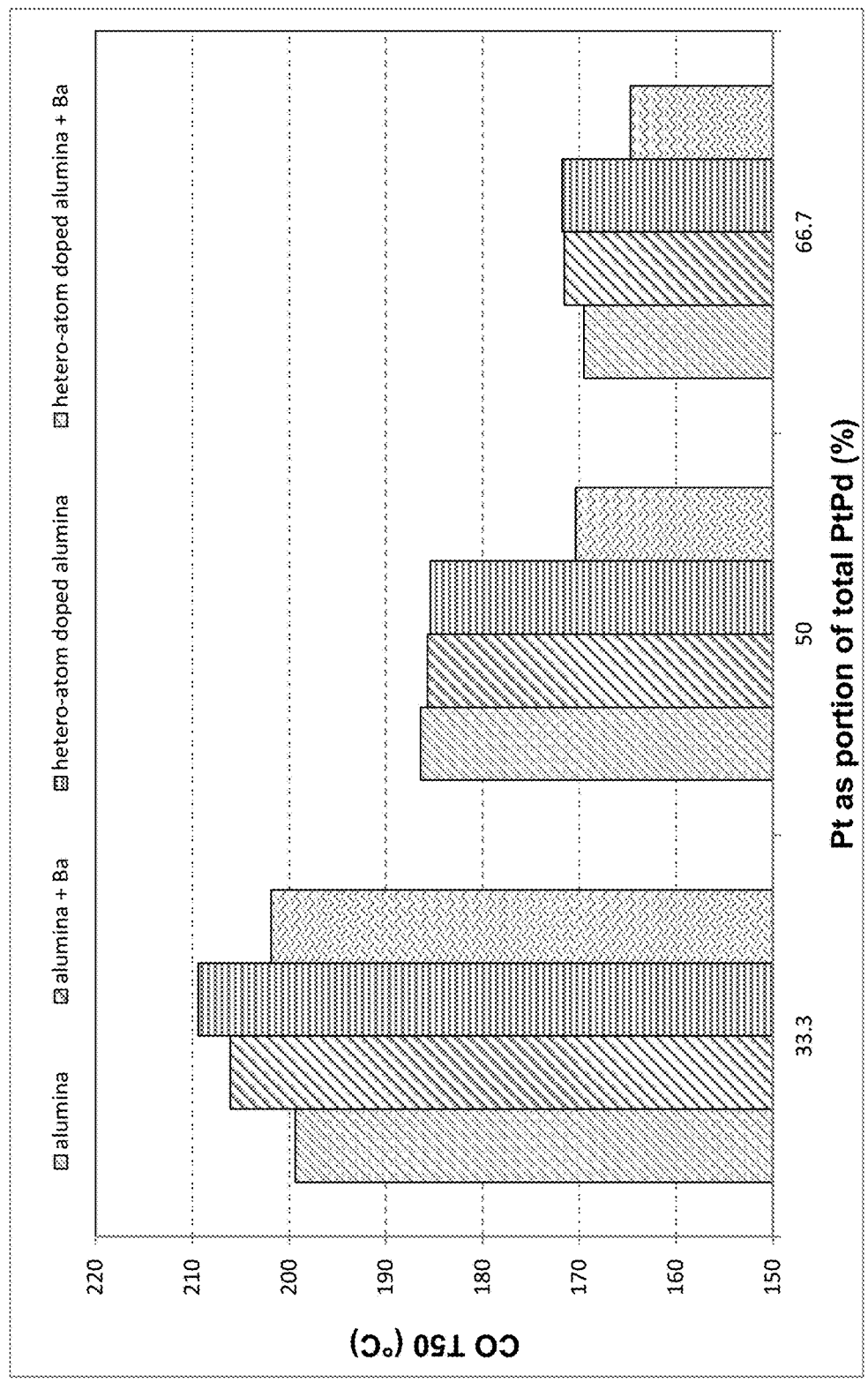

OXIDATION CATALYST FOR TREATING THE EXHAUST GAS OF A COMPRESSION IGNITION ENGINE

CROSS REFERENCE TO RELATED APPLICATIONS

This application is a continuation of U.S. patent application Ser. No. 14/691,104, filed Apr. 20, 2015, now U.S. Pat. No. 9,527,034, issued Dec. 27, 2016, which is a continuation of U.S. patent application Ser. No. 14/086,019, filed Nov. 21, 2013, now U.S. Pat. No. 9,034,286, issued May 19, 2015, which claims priority of Great Britain Patent Application No. 1220912.8 filed Nov. 21, 2012, U.S. Provisional Patent Application No. 61/728,834, filed Nov. 21, 2012, and Great Britain Patent Application No. 1308934.7, filed May 17, 2013, all of which are incorporated herein by reference.

FIELD OF THE INVENTION

The invention relates to an exhaust system for a compression ignition engine that comprises an oxidation catalyst, particularly a diesel oxidation catalyst, and to a vehicle comprising the exhaust system. The invention also relates to a process of preparing the oxidation catalyst, to the oxidation catalyst itself and its uses. The invention further relates to a method of treating an exhaust gas from a compression ignition engine.

BACKGROUND TO THE INVENTION

Generally, there are four classes of pollutant that are legislated against by inter-governmental organisations throughout the world: carbon monoxide (CO), unburned hydrocarbons (HCs), oxides of nitrogen ($NO_x$) and particulate matter (PM). As emissions standards for permissible emission of pollutants in exhaust gases from vehicular engines become progressively tightened, there is a need to provide improved catalysts that are able to meet these standards and which are cost-effective.

For compression ignition engines, such as diesel engines, an oxidation catalyst (known as a diesel oxidation catalyst (DOC)) is typically used to treat the exhaust gas produced by such engines. Diesel oxidation catalysts generally catalyse the oxidation of (1) carbon monoxide (CO) to carbon dioxide ($CO_2$), and (2) HCs to carbon dioxide ($CO_2$) and water ($H_2O$). Exhaust gas temperatures for compression ignition engines, such as diesel engines particularly for light-duty diesel vehicles, are relatively low (e.g. about 400° C.) and so one challenge is to develop durable catalyst formulations with low "light-off" temperatures.

The activity of oxidation catalysts, such as DOCs, is often measured in terms of its "light-off" temperature, which is the temperature at which the catalyst starts to perform a particular catalytic reaction or performs that reaction to a certain level. Normally, "light-off" temperatures are given in terms of a specific level of conversion of a reactant, such as conversion of carbon monoxide. Thus, a $T_{50}$ temperature is often quoted as a "light-off" temperature because it represents the lowest temperature at which a catalyst catalyses the conversion of a reactant at 50% efficiency.

EP 2000639 describes a method for increasing the temperature of an exhaust gas from an internal combustion engine, particularly a diesel engine. EP 2000639 is concerned with increasing the temperature of an exhaust gas because it can assist the regeneration of a particulate filter placed downstream from the catalyst. The method described in EP 2000639 involves introducing hydrocarbon (HC) in an amount of from 1,000 to 40,000 ppm by volume, as converted to methane, to the exhaust gas upstream of a catalyst. The catalyst is obtained by supporting a catalytically active component (A) consisting of (a) platinum, (b) an oxide of at least one metal selected from the group consisting of magnesium, an alkaline earth metal and an alkali metal, and (c) at least one member selected from the group of palladium and rhodium, on a refractory inorganic oxide powder (B), and supporting the inorganic oxide on a refractory three-dimensional structure body.

SUMMARY OF THE INVENTION

Catalysts that are used to oxidise carbon monoxide (CO), hydrocarbons (HCs) and sometimes also oxides of nitrogen ($NO_x$) in an exhaust gas emitted from a compression ignition engine generally comprise at least one platinum group metal, such as platinum or palladium. Platinum is more active than palladium at catalysing the oxidation of CO and HCs in the exhaust gas from a compression ignition engine and the inclusion of palladium in such catalysts was generally avoided because of its susceptibility to poisoning by sulphur. However, the use of ultra-low sulphur fuels, the relative cost of palladium to platinum, and improvements in catalyst durability that can be obtained by inclusion of palladium have resulted in catalyst formulations comprising palladium, especially formulations comprising both palladium and platinum, becoming favoured.

Even though, in general, the cost of palladium has historically been lower than that of platinum, both palladium and platinum are expensive metals. Oxidation catalysts that show improved catalytic activity without increasing the total amount of platinum and palladium, or that show similar catalytic activity to existing oxidation catalysts with a lower amount of platinum and palladium, are desirable.

In a first aspect, the invention provides an exhaust system for a compression ignition engine comprising an oxidation catalyst typically for treating carbon monoxide (CO) and hydrocarbons (HCs) in exhaust gas from the compression ignition engine, wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component; and a substrate, wherein the platinum group metal (PGM) component, the alkaline earth metal component and the support material are disposed on the substrate.

The inventors have surprisingly found that an oxidation catalyst having advantageous activity can be obtained when a combination of (i) an alkaline earth metal component and (ii) an alumina support material that has been modified to include a heteroatom component, is included in a catalyst formulation comprising at least one of platinum and palladium. Such catalysts have been found to have excellent low temperature CO oxidation activity. The catalysts are particularly effective in converting relatively high levels of CO in exhaust gas produced by the compression ignition engine, particularly at temperatures below 250° C. The catalysts may also show good oxidation activity towards HCs, particularly unsaturated HCs such as alkenes, at low temperatures. The relatively low temperature oxidation activity of the catalyst renders it particularly suitable for use in combination with other emissions control devices in an exhaust system. In particular, the oxidation catalyst is able to oxidise nitrogen oxide (NO) to nitrogen dioxide ($NO_2$), which can be advantageous when the oxidation catalyst is upstream of a selective catalytic reduction (SCR) catalyst or a selective catalytic reduction filter (SCRF) catalyst.

The initial oxidative activity of a freshly prepared oxidation catalyst often deteriorates until the catalyst reaches an aged state. Repeated exposure of the oxidation catalyst to hot exhaust gas can cause sintering and/or alloying of the platinum group metal (PGM) components of the catalyst until it reaches an aged state. This deterioration in activity can be problematic, particularly when pairing the oxidation catalyst with one or more other emissions control devices in an exhaust system. The oxidation catalyst of the invention may have stable activity toward oxidising nitrogen oxide (NO) to nitrogen dioxide ($NO_2$) (i.e. the "fresh" oxidative activity of the catalyst toward NO is the same or similar to the "aged" oxidative activity of the catalyst). This is particularly advantageous, even when the amount of NO oxidation may be relatively low, for exhaust systems where the oxidation catalyst is combined with a selective catalytic reduction (SCR) catalyst or a selective catalytic reduction filter (SCRF) catalyst because an exhaust gas having a stable ratio of $NO:NO_2$ can be passed into the SCR or SCRF catalyst.

A second aspect of the invention relates to a vehicle comprising a compression ignition engine and an exhaust system for the compression ignition engine, wherein the exhaust system comprises an oxidation catalyst, and wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component; and a substrate, wherein the platinum group metal (PGM) component, the alkaline earth metal component and the support material are disposed on the substrate.

In a third aspect, the invention relates to an oxidation catalyst and to its use for treating an exhaust gas from a compression ignition engine, such as a diesel engine. The oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component; and a substrate, wherein the platinum group metal (PGM) component, the alkaline earth metal component and the support material are disposed on the substrate. The invention generally relates to the use of the oxidation catalyst to oxidise carbon monoxide (CO) in an exhaust gas from a compression ignition engine. In particular, the invention relates to use of the oxidation catalyst to oxidise carbon monoxide (CO), hydrocarbons (HCs) and optionally oxides of nitrogen ($NO_x$), such as nitrogen oxide (NO), in an exhaust gas from a compression ignition engine.

In a fourth aspect, the invention provides a method of treating an exhaust gas from a compression ignition engine, which method comprises contacting the exhaust gas with an oxidation catalyst, wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component; and a substrate, wherein the platinum group metal (PGM) component, the alkaline earth metal component and the support material are disposed on the substrate. The method is generally a method of treating carbon monoxide (CO), preferably treating carbon monoxide (CO), hydrocarbons (HCs) and optionally oxides of nitrogen ($NO_x$), such as nitrogen oxide (NO), in an exhaust gas from a compression ignition engine.

A fifth aspect of the invention relates to a process of preparing an oxidation catalyst, which process comprises disposing a platinum group metal (PGM) component, an alkaline earth metal component, and a support material onto a substrate, wherein the platinum group metal (PGM) component is selected from the group consisting of a platinum (Pt) component, a palladium (Pd) component and a combination thereof, and the support material comprises a modified alumina incorporating a heteroatom component.

BRIEF DESCRIPTION OF THE DRAWINGS

FIG. 1 is a histogram showing measurements of carbon monoxide "light-off" temperatures (° C.) at 50% conversion (CO $T_{50}$) for catalyst formulations comprising varying amounts of platinum and palladium. The x-axis shows the % by weight of platinum in relation to the total content of platinum group metal in the formulation. At each point on the x-axis, the first bar (from the left) represents a sample containing standard alumina and no barium, the second bar represents a sample containing alumina and barium, the third bar represents a sample containing a modified alumina and no barium, and the fourth bar represents a sample containing a modified alumina and barium.

DETAILED DESCRIPTION OF THE INVENTION

The invention relates to an oxidation catalyst comprising an alkaline earth metal component. It has surprisingly been found that a catalyst having advantageous oxidising activity, particularly a low CO $T_{50}$, can be obtained for catalyst formulations comprising an alkaline earth metal component and a modified alumina incorporating a heteroatom component.

Typically, the alkaline earth metal component comprises magnesium (Mg), calcium (Ca), strontium (Sr), barium (Ba) or a combination of two or more thereof. It is preferred that the alkaline earth metal component comprises calcium (Ca), strontium (Sr), or barium (Ba), more preferably strontium (Sr) or barium (Ba), and most preferably the alkaline earth metal component comprises barium (Ba).

Generally, the alkaline earth metal component comprises a single alkaline earth metal selected from the group consisting of (Mg), calcium (Ca), strontium (Sr) and barium (Ba).

Preferably, the alkaline earth metal component comprises a single alkaline earth metal selected from the group consisting of calcium (Ca), strontium (Sr) and barium (Ba), more preferably strontium (Sr) and barium (Ba), and most preferably the alkaline earth metal component comprises a single alkaline earth metal that is barium (Ba).

Typically, the amount of the alkaline earth metal component is 0.07 to 3.75 mol ft$^{-3}$, particularly 0.1 to 3.0 mol ft$^{-3}$, more particularly 0.2 to 2.5 mol ft$^{-3}$ (e.g. 0.25 to 1.0 mol ft$^{-3}$), such as 0.3 to 2.25 mol ft$^{-3}$, especially 0. 0.35 to 1.85 mol ft$^{-3}$, preferably 0.4 to 1.5 mol ft$^{-3}$, even more preferably 0.5 to 1.25 mol ft$^{-3}$. Without wishing to be bound by theory, it is believed that the number of alkaline earth metal atoms that are present contributes to the advantageous activity of the catalyst and that this activity "levels-off" once the number of alkaline earth metal atoms has reached a certain amount. Too much of the alkaline earth metal component may affect the HC and NO oxidation performance of the catalyst. If there are an insufficient number of alkaline earth metal atoms, then the advantageous activity may not be obtained.

Generally, the total amount of the alkaline earth metal component is 10 to 500 g ft$^{-3}$ (e.g. 60 to 400 g ft$^{-3}$ or 10 to 450 g ft$^{-3}$), particularly 20 to 400 g ft$^{-3}$, more particularly 35 to 350 g ft$^{-3}$, such as 50 to 300 g ft$^{-3}$, especially 75 to 250 g ft$^{-3}$.

The oxidation catalyst, in general, comprises an amount of the alkaline earth metal component of 0.1 to 20% by weight, preferably 0.5 to 17.5% by weight, more preferably 1 to 15% by weight, and even more preferably 1.5 to 12.5% by weight. The amount of the alkaline earth metal component may be from 1.0 to 8.0% by weight, such as 1.5 to 7.5% by weight, particularly 2.0 to 7.0% by weight (e.g. 2.5 to 6.5% by weight or 2.0 to 5.0% by weight). The amount of the alkaline earth metal component may be from 5.0 to 17.5% by weight, such as 7.5 to 15% by weight, particularly 8.0 to 14% by weight (e.g. 8.5 to 12.5% by weight or 9.0 to 13.5% by weight).

Typically, the ratio of the total mass of the alkaline earth metal component to the total mass of the platinum group metal (PGM) component is 0.25:1 to 20:1 (e.g. 0.3:1 to 20:1). It is preferred that the ratio of the total mass of the alkaline earth metal component to the total mass of the platinum group metal (PGM) component is 0.5:1 to 17:1, more preferably 1:1 to 15:1, particularly 1.5:1 to 10:1, still more preferably 2:1 to 7.5:1, and even more preferably 2.5:1 to 5:1. When a platinum (Pt) component is present, then preferably the total mass of the alkaline earth component is greater than the total mass of the platinum (Pt) component.

The support material typically comprises, or consists essentially of, a modified alumina incorporating a heteroatom component. The heteroatom component that is incorporated into the alumina generally changes the chemical characteristics, physical structure and/or physical properties of the material in comparison to alumina itself, and generally also in comparison to a mixture of alumina with the heteroatom component. It is thought that the presence of the heteroatom component modifies the interaction of the alumina with the alkaline earth component. The modified alumina is typically alumina present in, or originating from, the gamma form (i.e. γ-alumina).

Typically, the heteroatom component comprises an element selected from the group consisting of a lanthanide and any one of Groups 1 to 14 of the Periodic Table (the IUPAC nomenclature for numbering the Groups of the Periodic Table is used herein, such that Group 1 comprises the alkali metals, Group 4 comprises Ti, Zr etc., and Group 14 comprises C, Si etc.). Preferably, the heteroatom component comprises an element selected from Group 2 (e.g. Mg, Ca, Sr or Ba), Group 4 (e.g. Ti or Zr), Group 14 (e.g. Si) of the Periodic Table and a lanthanide (e.g. La or Ce), such as an element selected from Group 4 (e.g. Ti or Zr), Group 14 (e.g. Si) of the Periodic Table and a lanthanide (e.g. La or Ce). The heteroatom component can be an element, ion or a compound, but it is not alumina and, preferably, it is not a constituent element or ion of alumina (e.g. oxygen, $O^{2-}$, aluminium or $Al^{3+}$).

The modified alumina incorporating a heteroatom component generally comprises, or consists essentially of, an alumina doped with a heteroatom component, an alkaline earth metal aluminate or a mixture thereof. It is preferred that the modified alumina incorporating a heteroatom component comprises, or consists essentially of, an alumina doped with a heteroatom component or an alkaline earth metal aluminate.

When the modified alumina incorporating a heteroatom component is alumina doped with a heteroatom component, then typically the heteroatom component comprises silicon, magnesium, barium, lanthanum, cerium, titanium, or zirconium or a combination of two or more thereof. The heteroatom component may comprises, or consist essentially of, an oxide of silicon, an oxide of magnesium, an oxide of barium, an oxide of lanthanum, an oxide of cerium, an oxide of titanium or an oxide of zirconium. Preferably, the heteroatom component comprises, or consists essentially of, silicon, magnesium, barium, or cerium, or an oxide thereof, particularly silicon, or cerium, or an oxide thereof. More preferably, the heteroatom component comprises, or consists essentially of, silicon, magnesium, or barium, or an oxide thereof; particularly silicon, or magnesium, or an oxide thereof; especially silicon or an oxide thereof.

Examples of alumina doped with a heteroatom component include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a heteroatom component is alumina doped with silica, alumina doped with barium or barium oxide, or alumina doped with magnesium oxide. More preferably, the alumina doped with a heteroatom component is alumina doped with silica or alumina doped with magnesium oxide. Even more preferably, the alumina doped with a heteroatom component is alumina doped with silica. Alumina doped with a heteroatom component can be prepared using methods known in the art or, for example, by a method described in U.S. Pat. No. 5,045,519.

Typically, the alumina doped with a heteroatom component comprises 0.5 to 45% by weight of the heteroatom component, preferably 1 to 40% by weight of the heteroatom component, more preferably 1.5 to 30% by weight of the heteroatom component, particularly 2.5 to 25% by weight of the heteroatom component.

When the alumina doped with a heteroatom component comprises, or consists essentially of, alumina doped with silica, then the alumina is doped with silica in an amount of 0.5 to 45% by weight, preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina doped with a heteroatom component comprises, or consists essentially of, alumina doped with magnesium oxide, then the alumina is doped with magnesium in an amount as defined above or an amount of 5 to 30% by weight, preferably 10 to 25% by weight.

If the heteroatom component comprises, or consists essentially of, an alkaline earth metal, then generally the oxidation catalyst comprises an alkaline earth metal component that is separate to, or is not part of, the modified alumina incorporating a heteroatom component. Thus, the oxidation catalyst includes an alkaline earth metal component in addition to any alkaline earth metal that may be present in the modified alumina.

Generally, when the heteroatom component comprises, or consists essentially of, an alkaline earth metal, then preferably the alkaline earth metal component is different to the heteroatom component. It is preferred that the heteroatom component and the alkaline earth metal component comprise different alkaline earth metals.

If the heteroatom component of the modified alumina comprises an alkaline earth metal, such as when it is a dopant in the alumina doped with a heteroatom component or when it is part of the alkaline earth metal aluminate, then the amount of the "alkaline earth metal component" does not include the amount of any alkaline earth metal that is present as part of the modified alumina. Similarly, the amount of heteroatom component does not include the amount of the alkaline earth metal component that is present. It is possible to control the amounts of each component during manufacture of the oxidation catalyst.

The term "alkaline earth metal aluminate" generally refers to a compound of the formula $MAl_2O_4$ where "M" represents the alkaline earth metal, such as Mg, Ca, Sr or Ba. Such compounds generally comprise a spinel structure. These compounds can be prepared using conventional methods well known in the art or, for example, by using a method described in EP 0945165, U.S. Pat. No. 6,217,837 or U.S. Pat. No. 6,517,795.

Typically, the alkaline earth metal aluminate is magnesium aluminate ($MgAl_2O_4$), calcium aluminate ($CaAl_2O_4$), strontium aluminate ($SrAl_2O_4$), or barium aluminate ($BaAl_2O_4$), or a mixture of two or more thereof. Preferably, the alkaline earth metal aluminate is magnesium aluminate ($MgAl_2O_4$).

Generally, when the support material comprises an alkaline earth metal aluminate, then the alkaline earth metal ("M") of the alkaline earth metal aluminate is different to the alkaline earth metal component. It is preferred that the alkaline earth metal aluminate and the alkaline earth metal component comprise different alkaline earth metals.

The oxidation catalyst of the invention generally comprises a total amount of support material of 0.1 to 5 g in$^{-3}$, preferably 0.2 to 4 g in$^{-3}$ (e.g. 0.5 to 3.5 g in$^{-3}$). When the oxidation catalyst comprises a second support material, in addition to the support material comprising the modified alumina, then the total amount refers to the amount of both the second support material and the support material comprising the modified alumina.

When the oxidation catalyst is used as a diesel oxidation catalyst, then generally the total amount of support material is 1 to 2.5 g in$^{-3}$. When the oxidation catalyst is used as a catalysed soot filter, then the total amount of support material is generally 0.2 to 4 g in$^{-3}$.

When the oxidation catalyst comprises a second support material, then typically the amount of the support material comprising the modified alumina is 0.1 to 3.0 g in$^{-3}$, preferably 0.2 to 2.5 g in$^{-3}$, still more preferably 0.3 to 2.0, and even more preferably 0.5 to 1.75 g in$^{-3}$.

In general, the ratio of the total mass of the alkaline earth metal component to the total mass of the support material comprising the modified alumina is 1:200 to 1:5, preferably 1:150 to 1:10, even more preferably 1:100 to 1:20.

Typically, the support material, particularly the alumina doped with a heteroatom component, is in particulate form. The support material may have a $d_{90}$ particle size of ≤20 μm (as determined by conventional laser diffraction techniques). The particle size distribution of the support material is selected to aid adhesion to the substrate. The particles are generally obtained by milling.

Generally, the support material has a specific surface area of 50 to 500 m$^2$ g$^{-1}$ (measured by BET in accordance with DIN 66131 or after activation at 550° C. for 3 hours). It is preferred that the support material has a specific surface area of 50 to 300 m$^2$ g$^{-1}$, more preferably 100 to 250 m$^2$ g$^{-1}$.

The oxidation catalyst optionally further comprises a second support material. Typically, the alkaline earth metal component is disposed or supported on the support material comprising the modified alumina and/or a second support material. When the oxidation catalyst comprises a plurality of layers, then the second support material and the support material comprising the modified alumina are preferably in different layers.

In general, the alkaline earth metal component is disposed or supported on at least one support material that comprises, or consists essentially of, a modified alumina incorporating a heteroatom component. Typically, the catalyst of the invention comprises a single support material, which support material comprises, or consists essentially of, the modified alumina incorporating a heteroatom component.

If a second support material is present, especially when the second support material is in the same layer as the first support material, then it is preferred that the alkaline earth metal component is substantially disposed or supported on the support material comprising the modified alumina (the term "substantially" in this context refers to at least 90%, preferably at least 99%, more preferably at least 99%, of the mass of the alkaline earth component that is present, typically in the layer or otherwise, is disposed on the support material comprising the modified alumina). It is further preferred that the alkaline earth metal component is only disposed or supported on the support material comprising the modified alumina. For some combinations of support materials in the same layer, it may be difficult to control the precise location of the alkaline earth metal component because of its solubility and the alkaline earth metal component may be disposed or support on all of the support materials.

The oxidation catalyst also comprises a platinum group metal (PGM) component selected from the group consisting of a platinum (Pt) component, a palladium (Pd) component and a combination thereof. The oxidation catalyst of the invention may comprise a single platinum group metal (PGM) component, which is either a platinum (Pt) component or a palladium (Pd) component.

Generally, it is preferred that the oxidation catalyst comprises a platinum (Pt) component and a palladium (Pd) component (i.e. the platinum group metal (PGM) component is a platinum (Pt) component and a palladium (Pd) component). The ratio of the total mass of the platinum (Pt) component to the total mass of the palladium (Pd) component is typically 3:1 to 1:3, preferably 2:1 to 1:2, and more preferably 1.5:1 to 1:1.5, especially when, but not exclusively, the oxidation catalyst comprises a plurality of layers.

Typically, the total amount of the platinum group metal (PGM) component (e.g. the total amount of the platinum (Pt) component and/or the palladium (Pd) component) is 5 to 500 g ft$^{-3}$. Preferably, the total amount of the PGM component is 10 to 400 g ft$^{-3}$, more preferably 20 to 300 g ft$^{-3}$, still more preferably, 25 to 250 g ft$^{-3}$, and even more preferably 35 to 200 g ft$^{-3}$.

When the oxidation catalyst is used as a diesel oxidation catalyst, then generally the total amount of the platinum group metal (PGM) component is 25 to 200 g ft$^{-3}$, more preferably 40 to 160 g ft$^{-3}$. When the oxidation catalyst is used as a catalysed soot filter, then the total amount of the platinum group metal (PGM) component is 5 to 100 g ft$^{-3}$, more preferably 10 to 40 g ft$^{-3}$.

Typically, the oxidation catalyst comprises a total amount by mass of the platinum group metal (PGM) component of 2.0 to 8.0 g. The total amount of PGM component that is used depends on, amongst other things, the size of the substrate and the intended application of the oxidation catalyst.

In addition to the platinum group metal (PGM) component, the oxidation catalyst of the invention may further comprise a noble metal component. The noble metal component comprises a noble metal selected from the group consisting of ruthenium (Ru), rhodium (Rh), iridium (Ir), gold (Au), silver (Ag) and a combination of two or more thereof. It is preferred that the noble metal component comprises a noble metal selected from the group consisting of gold, silver and a combination thereof. More preferably, the noble metal component comprises, or consists of, gold. When the catalyst comprises gold (Au), then a platinum group metal (PGM) component, preferably a palladium (Pd) component, is present as an alloy with gold (Au) (e.g. a palladium-gold alloy). Catalysts comprising gold (Au) can be prepared using the method described in WO 2012/120292 by the present Applicant.

The oxidation catalyst of the invention optionally further comprises a hydrocarbon adsorbent. The hydrocarbon adsorbent may be selected from a zeolite, active charcoal, porous graphite and a combination of two or more thereof. It is preferred that the hydrocarbon adsorbent is a zeolite. More preferably, the zeolite is a medium pore zeolite (e.g. a zeolite having a maximum ring size of eight tetrahedral atoms) or a large pore zeolite (e.g. a zeolite having a maximum ring size of ten tetrahedral atoms). Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

Typically, the zeolite has a silica to alumina molar ratio of at least 25:1, preferably at least 25:1, with useful ranges of from 25:1 to 1000:1, 50:1 to 500:1 as well as 25:1 to 100:1, 25:1 to 300:1, from 100:1 to 250:1. Zeolites having a high molar ratio of silica to alumina show improved hydrothermal stability.

When the catalyst comprises a hydrocarbon adsorbent, then typically the total amount of hydrocarbon adsorbent is 0.05 to 3.00 g in$^{-3}$, particularly 0.10 to 2.00 g in$^{-3}$, more particularly 0.2 to 0.8 g in$^{-3}$.

The catalyst of the invention optionally further comprises an oxygen storage material. Such materials are well-known in the art. The oxygen storage material may be selected from ceria ($CeO_2$) and ceria-zirconia ($CeO_2$—$ZrO_2$), such as a ceria-zirconia solid solution.

Typically, at least one platinum group metal (PGM) component is supported on the support material comprising the modified alumina incorporating a heteroatom component. Thus, a platinum (Pt) component or a palladium (Pd) component or both a platinum (Pt) component and a palladium (Pd) component is supported on the support material.

Generally, the alkaline earth metal component and at least one platinum group metal (PGM) component is supported on the support material comprising the modified alumina incorporating a heteroatom component. Thus, the oxidation catalyst of the invention may comprise a palladium (Pd) component and/or a platinum (Pt) component and an alkaline earth metal component supported on the same support material, namely the support material comprising the modified alumina incorporating a heteroatom component. It is preferred that a palladium (Pd) component, a platinum (Pt) component and an alkaline earth metal component are supported on the support material comprising the modified alumina incorporating a heteroatom component.

As mentioned above, the oxidation catalyst may or may not further comprise a second support material. The second support material may be selected from the group consisting of alumina, silica, alumina-silica, zirconia, titania, ceria and a mixture of two or more thereof. The second support material is preferably selected from the group consisting of alumina, silica, zirconia, titania and a mixture of two or more thereof, particularly alumina, silica, titania and a mixture of two or more thereof. More preferably, the second support material comprises, or consists of, alumina.

When the oxidation catalyst comprises a second support material, then preferably at least one platinum group metal (PGM) component is supported on the second support material. A platinum (Pt) component, a palladium (Pd) component or both a platinum (Pt) component and a palladium (Pd) component may be supported on the second support material.

In addition or as alternative to being supported on the support material comprising the modified alumina, the alkaline earth metal component may be supported on the second support material. However, it is preferred that the alkaline earth metal component is only supported on the support material comprising the modified alumina (i.e. the alkaline earth metal component is not supported on the second support material).

If the oxidation catalyst comprises a noble metal component and/or an oxygen storage material, then the noble metal component and/or the oxygen storage material may be supported on the support material comprising the modified alumina and/or, if present, the second support material. When the oxidation catalyst additionally comprises an oxygen storage material and a second support material, then the oxygen storage material and the second support material are different (e.g. the oxygen storage material and the second support material are not both ceria or ceria-zirconia).

Generally, the platinum group metal (PGM) component(s), the alkaline earth metal component, the support material and any optional noble metal component, oxygen storage material, hydrocarbon adsorbent and/or second storage material are disposed or supported on the substrate.

The oxidation catalyst of the invention comprises a substrate. The oxidation catalyst may comprise a plurality of substrates (e.g. 2, 3 or 4 substrates), more preferably two substrates (i.e. only two substrates). When there are two substrates, then a first substrate may be in contact with or separate from a second substrate. When the first substrate is separate from the second substrate, then preferably the distance (e.g. the perpendicular distance between faces) between an outlet end (e.g. the face at an outlet end) of the first substrate and inlet end (e.g. the face at an inlet end) of the second substrate is from 0.5 mm to 50 mm, preferably 1 mm to 40 mm, more preferably 1.5 mm to 30 mm (e.g. 1.75 mm to 25 mm), such as 2 mm to 20 mm (e.g. 3 mm to 15 mm), and still more preferably 5 mm to 10 mm.

In general, it is preferred that the oxidation catalyst comprises a single substrate (i.e. only one substrate).

Substrates for supporting oxidation catalysts for treating the exhaust gas of a compression ignition engine are well known in the art. Generally, the substrate is a ceramic material or a metallic material.

It is preferred that the substrate is made or composed of cordierite ($SiO_2$—$Al_2O_3$—MgO), silicon carbide (SiC), Fe—Cr—Al alloy, Ni—Cr—Al alloy, or a stainless steel alloy.

Typically, the substrate is a monolith. It is preferred that the monolith is a flow-through monolith or a filtering monolith.

In general, the oxidation catalyst of the invention is for use as a diesel oxidation catalyst (DOC) or a catalysed soot filter (CSF). In practice, catalyst formulations employed in DOCs and CSFs are similar. Generally, however, a principle difference between a DOC and a CSF is the substrate onto which the catalyst formulation is coated and the amount of PGM component in the coating.

A flow-through monolith typically comprises a honeycomb monolith (e.g. a metal or ceramic honeycomb monolith) having a plurality of channels extending therethrough, which channels are open at both ends. When the substrate is a flow-through monolith, then the oxidation catalyst of the invention is typically a diesel oxidation catalyst (DOC) or is for use as a diesel oxidation catalyst (DOC).

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the oxidation catalyst of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channel and the outlet channels have a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

Generally, the oxidation catalyst of the invention comprises a single layer or a plurality of layers (e.g. 2, 3 or 4 layers) disposed on the substrate. Typically, each layer is formed by applying a washcoat coating onto the substrate.

The oxidation catalyst of the invention may comprise, or consist of, a substrate and a single layer disposed on the substrate, wherein the single layer comprises a platinum group metal (PGM) component selected from the group consisting of a platinum (Pt) component, a palladium (Pd) component and a combination thereof; an alkaline earth metal component; and the support material comprising the modified alumina incorporating a heteroatom component. The single layer may further comprise a noble metal component and/or an oxygen storage material and/or a hydrocarbon adsorbent and/or a second storage material. It is preferred that the single layer further comprises a hydrocarbon adsorbent and optionally an oxygen storage material.

When the oxidation catalyst comprises, or consists of, a substrate and a single layer disposed on the substrate, then preferably the single layer comprises a platinum (Pt) component and a palladium (Pd) component (i.e. the platinum group metal (PGM) component is a platinum (Pt) component and a palladium (Pd) component). When the single layer comprises a platinum (Pt) component and a palladium (Pd) component, then the relative amount of the platinum (Pt) component to the palladium (Pd) component can vary.

Typically, the ratio by mass of the platinum (Pt) component to the palladium (Pd) component is ≥35:65 (e.g. ≥7:13). It is preferred that the ratio by mass of the platinum (Pt) component to the palladium (Pd) component is ≥40:60 (e.g. ≥2:3), more preferably ≥42.5:57.5 (e.g. ≥17:23), particularly ≥45:55 (e.g. ≥9:11), such as ≥47.5:52.5 (e.g. ≥19:21), and still more preferably ≥50:50 (e.g. ≥1:1). The ratio by mass (i.e. mass ratio) of the platinum (Pt) component to the palladium (Pd) component is typically 80:20 to 35:65 (e.g. 4:1 to 7:13). It is preferred that the ratio by mass of the platinum (Pt) component to the palladium (Pd) component is 75:25 to 40:60 (e.g. 3:1 to 2:3), more preferably 70:30 to 42.5:57.5 (e.g. 7:3 to 17:23), even more preferably 67.5:32.5 to 45:55 (e.g. 27:13 to 9:11), such as 65:35 to 47.5:52.5 (e.g. 13:7 to 19:21), and still more preferably 60:40 to 50:50 (e.g. 3:2 to 1:1).

It is thought that oxidation catalysts where the mass of the palladium (Pd) component is less than the mass of the platinum (Pt) component have advantageous activity. Thus, the catalyst of the invention preferably comprises the platinum (Pt) component and the palladium (Pd) component in a ratio by mass of 65:35 to 52.5:47.5 (e.g. 13:7 to 21:19), more preferably 60:40 to 55:45 (e.g. 3:2 to 11:9).

Typically, the ratio by mass (i.e. mass ratio) of the alkaline earth metal component to the platinum group metal (PGM) component is 0.25:1 to 20:1. It is preferred that the mass ratio of the alkaline earth metal component to the platinum group metal (PGM) component is 0.5:1 to 17:1, more preferably 1:1 to 15:1, particularly 1.5:1 to 10:1, still more preferably 2:1 to 7.5:1, and even more preferably 2.5:1 to 5:1.

The oxidation catalyst preferably comprises a plurality of layers, such as 2, 3 or 4 layers.

When there is a plurality of layers, then the oxidation catalyst may comprise a plurality of substrates, preferably two substrates. When there is a plurality of substrates (e.g. two substrates), then preferably a first layer is disposed on a first substrate and a second layer is disposed on a second substrate. Thus, any reference below to the first layer being disposed on the substrate may refer to the first layer being disposed on the first substrate. Similarly, any reference below to the second layer being disposed on the second substrate may refer to the second layer being disposed on the second substrate.

When there is a plurality of substrates, then the first substrate may be upstream of the second substrate. Alternatively, the second substrate may be upstream of the first substrate.

In general, it is preferred that the oxidation catalyst comprises a single substrate, particularly when the oxidation catalyst comprises a plurality of layers.

When there is a plurality of layers, then generally a first layer is disposed on the substrate (e.g. the first layer is preferably disposed directly on the substrate, such that the first layer is in contact with a surface of the substrate). The first layer may be disposed on a third layer or a fourth layer. It is preferable that the first layer is disposed directly on the substrate.

A second layer may be disposed on the substrate (e.g. to form a zone as described below, which is separate from, or partly overlaps with, the first layer) or the second layer may be disposed on the first layer.

When the second layer is disposed on the first layer, it may completely or partly overlap (i.e. cover) the first layer. If the catalyst comprises a third layer, then the third layer may be disposed on the second layer and/or the first layer, preferably the third layer is disposed on the first layer. If the catalyst comprises a fourth layer, then the fourth layer may be disposed on the third layer and/or the second layer.

When the second layer is disposed on the substrate (e.g. to form a zone), then the second layer may be disposed directly on the substrate (i.e. the second layer is in contact with a surface of the substrate) or it may be disposed on a third layer or a fourth layer.

The first layer may be a zone (e.g. a first zone) and/or the second layer may be a zone (e.g. a second zone). For the avoidance of doubt, features described herein relating to the "first layer" and "second layer", especially the composition of the "first layer" and the "second layer", also relate to the "first zone" and "second zone" respectively.

The first layer may be a first zone and the second layer may be a second zone, such as when the first zone and second zone are side-by-side on the same substrate or the first zone is disposed on a first substrate and a second zone is disposed on a second substrate (i.e. the first substrate and the second substrate are different) and the first substrate and second substrate are side-by-side. Preferably, the first zone and second zone are disposed on the same substrate.

The first zone may be upstream of the second zone. When the first zone is upstream of the second zone, inlet exhaust gas will contact the first zone before the second zone. Alternatively, the second zone may be upstream of the first zone. Similarly, when the second zone is upstream of the first zone, inlet exhaust gas will contact the second zone before the first zone.

When the first zone and the second zone are disposed on the same substrate, then the first zone may abut the second zone or the first zone may be separate from the second zone. If the first zone abuts the second zone, then preferably the first zone is in contact with the second zone. When the first zone is separate from the second zone, then typically there is a gap or space between the first zone and the second zone.

Typically, the first zone has a length of 10 to 80% of the length of the substrate (e.g. 10 to 45%), preferably 15 to 75% of the length of the substrate (e.g. 15 to 40%), more preferably 20 to 60% (e.g. 25 to 45%) of the length of the substrate, still more preferably 25 to 50%.

The second zone typically has a length of 10 to 80% of the length of the substrate (e.g. 10 to 45%), preferably 15 to 75% of the length of the substrate (e.g. 15 to 40%), more preferably 20 to 60% (e.g. 25 to 45%) of the length of the substrate, still more preferably 25 to 50%.

A preferred oxidation catalyst comprises two layers (e.g. only two layers), wherein a first layer is disposed on the substrate and a second layer is disposed on the first layer.

Typically, the second layer completely or partly overlaps the first layer.

The first layer and the second layer may have different lengths, or the first layer and the second layer may have about the same length. Generally, the length of the first layer and the length of the second layer is each substantially uniform.

The first layer typically extends for substantially an entire length of the channels in the substrate, particularly when the substrate is a monolith.

In an oxidation catalyst comprising a plurality of layers, the second layer may be arranged in a zone of substantially uniform length at a downstream end of the substrate. It is preferred that the zone at the downstream end is nearer to the outlet end of the substrate than to the inlet end. Methods of making differential length layered coatings are known in the art (see for example WO 99/47260 by the present Applicant).

When the oxidation catalyst comprises a plurality of layers, then the platinum group metal (PGM) component, the alkaline earth metal component and the support material comprising the modified alumina can be distributed amongst the layers in a variety of ways.

In general, the first layer (or first zone) comprises a platinum group metal (PGM) component selected from the group consisting of a platinum (Pt) component, a palladium (Pd) component and a combination thereof, and the second layer (or second zone) comprises a platinum group metal (PGM) component selected from the group consisting of a platinum (Pt) component, a palladium (Pd) component and a combination thereof. It is preferred that the first layer/zone is different (e.g. in composition) to the second layer/zone. For example, the first and second layers/zones may comprise different platinum group metal (PGM) components and/or the first and second layers/zones may comprise a different total amount of the platinum group metal (PGM) component.

In a first embodiment, the first layer (or first zone) comprises a PGM component selected from the group consisting of a Pd component and a combination of (i.e. both) a Pd component and a Pt component, and the second layer (or second zone) comprises a PGM component consisting of a Pt component. This means that the first layer/zone comprises a Pd component and optionally a Pt component as the only PGM component, and the second layer/zone comprises a Pt component as the only PGM component. Preferably, the first layer/zone comprises a PGM component consisting of a combination of (i.e. both) a Pd component and a Pt component. Thus, it is preferred that the first layer/zone comprises both a Pt component and a Pd component as the only PGM component, and the second layer/zone comprises a Pt component as the only PGM component.

Typically, in the first embodiment, the first layer (or first zone) further comprises the alkaline earth metal component and the support material comprising a modified alumina incorporating a heteroatom component, and/or the second layer (or second zone) further comprises the alkaline earth metal component and the support material comprising a modified alumina incorporating a heteroatom component. It is preferred that the first layer/zone further comprises the alkaline earth metal component and the support material comprising a modified alumina incorporating a heteroatom component.

When the first layer/zone comprises a Pd component as the only PGM component, then the first layer/zone may comprise a second support material. Preferably the second support material is ceria, ceria-zirconia, alumina or silica-alumina. The second support material may be ceria. The second support material may be ceria-zirconia. The second support material may be alumina. The second support material may be silica-alumina. More preferably, the first layer/zone comprises a PGM component selected from the group consisting of a Pd component, and a second support material, wherein the second support material is ceria.

In a second embodiment, the first layer (or first zone) comprises a PGM component selected from the group consisting of a Pt component and a combination of (i.e. both) a Pd component and a Pt component, and the second layer (or second zone) comprises a PGM component consisting of a Pd component. This means that the first layer/zone comprises a Pt component and optionally a Pd component as the only PGM component, and the second layer/zone comprises a Pd component as the only PGM component.

Preferably, the first layer/zone comprises a PGM component consisting of a combination of (i.e. both) a Pd component and a Pt component. Thus, it is preferred that the first layer/zone comprises both a Pt component and a Pd component as the only PGM component, and the second layer/zone comprises a Pd component as the only PGM component. Typically, the amount of the Pt component in the first layer/zone is greater than the amount of the Pd component in the first layer/zone (the amount being measured in g ft$^{-3}$ or as a molar amount).

In the second embodiment, the first layer (or first zone) may further comprise the alkaline earth metal component and the support material comprising a modified alumina incorporating a heteroatom component, and/or the second layer (or second zone) may further comprise the alkaline earth metal component and the support material comprising a modified alumina incorporating a heteroatom component. It is preferred that the first layer/zone further comprises the alkaline earth metal component and the support material comprising a modified alumina incorporating a heteroatom component.

In the second embodiment, the second layer/zone typically comprises a second support material. Preferably the second support material is ceria, ceria-zirconia, alumina or silica-alumina. The second support material may be ceria. The second support material may be ceria-zirconia. The second support material may be alumina. The second support material may be silica-alumina.

In a third embodiment, the first layer (or first zone) comprises a PGM component selected from the group consisting of a Pt component and a Pd component, and the second layer (or second zone) comprises a PGM component consisting of a combination of (i.e. both) a Pd component and a Pt component. This means that the first layer/zone comprises a Pt component or a Pd component as the only PGM component, and the second layer/zone comprises a Pt component and a Pd component as the only PGM component. Preferably, the first layer/zone comprises a PGM component consisting of a Pt component. Thus, it is preferred that the first layer/zone comprises a Pt component as the only PGM component, and the second layer/zone comprises a Pt component and a Pd component as the only PGM component.

In the third embodiment, when the first layer/zone comprises a Pt component as the only PGM component, then typically the ratio by mass of the Pt component in the second layer/zone to the Pd component in the second layer/zone is ≤2:1, preferably <2:1. When the first layer/zone comprises a Pd component as the only PGM component, then typically the amount of the Pd component in the second layer/zone is less than the amount of the Pt component in the second layer/zone (the amount being measured in g ft$^{-3}$ or is a molar amount).

Typically, in the third embodiment, the first layer (or first zone) further comprises the alkaline earth metal component and the support material comprising a modified alumina incorporating a heteroatom component, and/or the second layer (or second zone) further comprises the alkaline earth metal component and the support material comprising a modified alumina incorporating a heteroatom component. When the first layer/zone comprises a Pt component as the only PGM component, then it is preferred that the first layer/zone further comprises the alkaline earth metal component and the support material comprising a modified alumina incorporating a heteroatom component. When the first layer/zone comprises a Pd component as the only PGM component, then it is preferred that the second layer/zone further comprises the alkaline earth metal component and the support material comprising a modified alumina incorporating a heteroatom component.

In the third embodiment, when the first layer/zone comprises a Pd component as the only PGM component, then the first layer/zone may comprise a second support material. Preferably the second support material is ceria, ceria-zirconia, alumina or silica-alumina. The second support material may be ceria. The second support material may be ceria-zirconia. The second support material may be alumina. The second support material may be silica-alumina.

In a fourth embodiment, the first layer (or first zone) comprises a PGM component consisting of a combination of (i.e. both) a Pt component and a Pd component, and the second layer (or second zone) comprises a PGM component consisting of a combination of (i.e. both) a Pd component and a Pt component. This means that first layer/zone comprises a Pt component and a Pd component as the only PGM component, and the second layer/zone comprises a Pt component or a Pd component as the only PGM component. In the fourth embodiment, the first layer/zone and second layer/zone typically comprise a different ratio by mass of the Pt component to the Pd component. Thus, the ratio by mass of the Pt component to the Pd component in the first layer/zone is different to the ratio by mass of the Pt component to the Pd component in the second/zone layer.

In the fourth embodiment, when the amount of the Pd component in the first layer/zone is less than the amount of the Pt component in the first layer/zone (the amount being measured in gft$^{-3}$ or is a molar amount), then preferably the amount of the Pd component in the second layer/zone is greater than the amount of the Pt component in the second layer/zone. Alternatively, when the amount of the Pd component in the first layer/zone is greater than the amount of the Pt component in the first layer/zone (the amount being measured in g ft$^{-3}$ or is a molar amount), then preferably the amount of the Pd component in the second layer/zone is less than the amount of the Pt component in the second layer/zone.

Generally, the ratio by mass of the platinum (Pt) component to the palladium (Pd) component, particularly in first layer/zone of the first or second embodiments, the second layer/zone of the third embodiment, or the first layer/zone and/or second layer/zone of the fourth embodiment, preferably the second layer/zone of the fourth embodiment, is ≥35:65 (e.g. ≥7:13). It is preferred that the ratio by mass of the platinum (Pt) component to the palladium (Pd) component is ≥40:60 (e.g. ≥2:3), more preferably ≥42.5:57.5 (e.g. ≥17:23), particularly ≥45:55 (e.g. ≥9:11), such as ≥47.5:52.5 (e.g. ≥19:21), and still more preferably ≥50:50 (e.g. ≥1:1).

It is preferred that the ratio by mass of the platinum (Pt) component to the palladium (Pd) component, particularly in first layer/zone of the first or second embodiments, the second layer/zone of the third embodiment, or the first layer/zone and/or second layer/zone of the fourth embodiment, preferably the second layer/zone of the fourth embodiment, is 80:20 to 35:65 (e.g. 4:1 to 7:13), particularly 75:25 to 40:60 (e.g. 3:1 to 2:3), more preferably 70:30 to 42.5:57.5 (e.g. 7:3 to 17:23), even more preferably 67.5:32.5 to 45:55 (e.g. 27:13 to 9:11), such as 65:35 to 47.5:52.5 (e.g. 13:7 to 19:21), and still more preferably 60:40 to 50:50 (e.g. 3:2 to 1:1). For the second layer of the third embodiment, it is particularly preferable that the ratio by mass of the platinum (Pt) component to the palladium (Pd) component is 2:1 to 7:13, particularly 13:7 to 2:3, more preferably 60:40 to 50:50 (e.g. 3:2 to 1:1)

It is thought that oxidation catalysts where the mass of the palladium (Pd) component is less than the mass of the platinum (Pt) component have advantageous activity, especially when both a platinum (Pt) component, a palladium (Pd) component and an alkaline earth metal component are present in the same layer/zone. Thus, in the first layer/zone of the first embodiment, the first layer/zone of the second embodiment, the second layer/zone of the third embodiment, or the first layer/zone and/or second layer/zone of the fourth embodiment, preferably the second layer/zone of the fourth embodiment, the oxidation catalyst of the invention preferably comprises the platinum (Pt) component and the palladium (Pd) component in a ratio by mass of 65:35 to 52.5:47.5 (e.g. 13:7 to 21:19), more preferably 60:40 to 55:45 (e.g. 3:2 to 11:9).

In a fifth embodiment, the first layer (or first zone) comprises a PGM component selected from the group consisting of a Pt component and a Pd component, and the second layer (or second zone) comprises a PGM component selected from the group consisting of a Pd component and a Pt component, and wherein the first and second layer/zone each comprise the same PGM component. This means that the first layer/zone and the second layer/zone each comprise a Pt component or a Pd component as the only PGM component. Typically, the total amount of PGM component in the first layer/zone is different to the total amount of PGM component in the second layer/zone.

When both the first layer/zone and the second layer/zone each comprise a Pd component as the only PGM component, then preferably the first layer/zone comprises a second support material and/or the second layer/zone comprises a second support material. It is preferred that the second support material is ceria, ceria-zirconia, alumina or silica-alumina. The second support material may be ceria. The second support material may be ceria-zirconia. The second support material may be alumina. The second support material may be silica-alumina.

In the first to fifth embodiments, the first layer/zone may comprise an alkaline earth metal component and/or the second layer/zone may comprise an alkaline earth metal component. When the first layer/zone comprises the alkaline earth metal component, the second layer/zone may not comprise an alkaline earth metal component. Alternatively, when the second layer/zone comprises the alkaline earth metal component, the first layer/zone may not comprise an alkaline earth metal component.

In the first to fifth embodiments, the first layer/zone may comprise the support material comprising the modified alumina, and/or the second layer/zone may comprise the support material comprising the modified alumina. Typically, it is preferred that a layer or zone comprising a platinum (Pt) component also comprises the support material comprising the modified alumina.

In the first to fifth embodiments, the first layer/zone may comprise a second support material and/or the second layer/zone may comprise a second support material. The first layer/zone and the second layer/zone may comprise different support materials. It is preferred that the second support material and the support material comprising the modified alumina are in different layers/zones.

In general, the alkaline earth metal component and the support material comprising the modified alumina are present in at least one of the same layers/zones.

When the first layer/zone comprises the alkaline earth metal component, then typically the ratio of the mass of the alkaline earth metal component to the mass of the platinum group metal (PGM) component in the first layer is 0.25:1 to 20:1, preferably 0.5:1 to 17:1, more preferably 1:1 to 15:1, particularly 1.5:1 to 10:1, still more preferably 2:1 to 7.5:1, and even more preferably 2.5:1 to 5:1.

When the second layer/zone comprises the alkaline earth metal component, then typically the ratio of the mass of the alkaline earth metal component to the mass of the platinum group metal (PGM) component in the second layer is 0.25:1 to 20:1, preferably 0.5:1 to 17:1, more preferably 1:1 to 15:1, particularly 1.5:1 to 10:1, still more preferably 2:1 to 7.5:1, and even more preferably 2.5:1 to 5:1.

In the first to fifth embodiments, the first layer/zone may optionally further comprise a noble metal component and/or an oxygen storage material and/or a hydrocarbon adsorbent. Preferably, the first layer/zone further comprises a hydrocarbon adsorbent.

In the first to fifth embodiments, the second layer/zone may optionally further comprise a noble metal component and/or an oxygen storage material and/or a hydrocarbon adsorbent. Preferably, the second layer/zone further comprises a hydrocarbon adsorbent.

In one aspect of the first embodiment, the first layer/zone typically comprises a Pd component, a Pt component, an alkaline earth metal component and the support material comprising the modified alumina; and the second layer/zone comprises a Pt component and either a second support material or a support material comprising the modified alumina, and optionally an alkaline earth metal component. When the second layer/zone comprises a second support material, then preferably the second support material is alumina.

In one aspect of the fourth embodiment, the first layer/zone comprises a Pt component, a Pd component, an alkaline earth metal component and the support material comprising the modified alumina; and the second layer/zone comprises a Pt component, a Pd component and either a second support material or a support material comprising the modified alumina, and optionally an alkaline earth metal component. It is preferred that the ratio by mass of the Pt component in the second layer/zone to the Pd component in the second layer is ≤10:1 (e.g. 10:1 to 1:2), more preferably ≤15:2 (e.g. 7.5:1 to 1:1.5), and still more preferably ≤5:1 (e.g. 5:1 to 1.5:1). When the second layer/zone comprises a second support material, then preferably the second support material is alumina.

When the first layer is a first zone and the second layer is a second zone, then (a) in the first and third embodiments it is preferred that the first layer/zone is upstream of the second layer/zone, (b) in the second embodiment it is preferred that the second layer/zone is upstream of the first layer/zone, and (c) in the fifth embodiment it is preferred that the layer/zone comprising the second support material is upstream of the layer/zone comprising the support material comprising the modified alumina.

In embodiments where there is a second support material, especially when the second support material is either ceria or ceria-zirconia, then it may be advantageous to arrange the layer or zone comprising the second support material to contact the exhaust gas after the other layer or zone. Thus, when there is a second support material, especially when the second support material is ceria or ceria-zirconia, it is preferred that (a) in the first and third embodiments it is preferred that the first layer/zone is downstream of the second layer/zone, (b) in the second embodiment it is preferred that the second layer/zone is downstream of the first layer/zone, and (c) in the fifth embodiment it is preferred that the layer/zone comprising the second support material is downstream of the layer/zone comprising the support material comprising the modified alumina.

In general, the oxidation catalyst of the invention may or may not comprise rhodium. It is preferred that the oxidation catalyst does not comprise ruthenium, rhodium, and iridium.

Another general feature of the oxidation catalyst of the invention is that when any cerium or ceria is present, then typically only the heteroatom component of the support material comprises the cerium or ceria. It is further preferred that the oxidation catalyst of the invention does not comprise ceria, particularly as a support material or as an oxygen storage material.

A further general feature of the oxidation catalyst of the invention is that when an alkali metal, particularly sodium or potassium, and especially potassium, is present, then preferably only the hydrocarbon adsorbent comprises the alkali metal, especially when the hydrocarbon adsorbent is a zeolite. It is further preferred that the oxidation catalyst of the invention does not comprise an alkali metal, particularly sodium or potassium.

Another general feature of the invention is that the oxidation catalyst of the invention does not comprise a $NO_x$ adsorber composition. Thus, it is preferred that the oxidation catalyst of the invention is not a $NO_x$ adsorber catalyst (also known as a $NO_x$ trap) or is not for use as a $NO_x$ adsorber catalyst.

Typically, the oxidation catalyst is for use as a diesel oxidation catalyst (DOC) or a catalysed soot filter (CSF).

The first aspect of the invention relates to an exhaust system for a compression ignition engine, such as a diesel engine, which system comprises the oxidation catalyst defined above. The third aspect of the invention relates to the use of the oxidation catalyst. The advantageous activity of the oxidation catalyst of the invention, particularly its low CO "light off" temperature, render it particularly suited for use in combination with certain other emissions control devices.

Typically, the exhaust system may further comprise, or the oxidation catalyst is for use in combination with, at least one emissions control device. The emissions control device may be selected from a diesel particulate filter (DPF), a $NO_x$ adsorber catalyst (NAC), a lean $NO_x$ catalyst (LNC), a selective catalytic reduction (SCR) catalyst, a diesel oxidation catalyst (DOC), a catalysed soot filter (CSF), a selective catalytic reduction filter (SCRF) catalyst, and combinations of two or more thereof. Emissions control devices represented by the terms diesel particulate filters (DPFs), $NO_x$ adsorber catalysts (NACs), lean $NO_x$ catalysts (LNCs), selective catalytic reduction (SCR) catalysts, diesel oxidation catalyst (DOCs), catalysed soot filters (CSFs) and selective catalytic reduction filter (SCRF) catalysts are all well known in the art.

Examples of emissions control devices for use with the oxidation catalyst of the invention or for inclusion in the exhaust system of the invention are provided below.

The diesel particulate filter preferably comprises a substrate, wherein the substrate is a filtering monolith as defined above. The substrate may be coated with a catalyst formulation.

The catalyst formulation of the diesel particulate file may be suitable for oxidising (i) particulate matter (PM) and/or (ii) carbon monoxide (CO) and hydrocarbons (HCs). When the catalyst formulation is suitable for oxidising PM, then the resulting emissions control device is known as a catalysed soot filter (CSF). Typically, the catalyst formulation comprises a noble metal as defined above and/or platinum and/or palladium.

The catalyst formulation of the diesel particulate filter may be a $NO_x$ adsorber composition. When the catalyst formulation is a $NO_x$ adsorber composition, the emissions control device is an example of a $NO_x$ adsorber catalyst (NAC). Emissions control devices where the catalyst formulation is a $NO_x$ adsorber composition have been described (see, for example, EP 0766993). $NO_x$ adsorber compositions are well known in the art (see, for example, EP 0766993 and U.S. Pat. No. 5,473,887). $NO_x$ adsorber compositions are designed to adsorb $NO_x$ from lean exhaust gas (lambda >1) and to desorb the $NO_x$ when the oxygen concentration in the exhaust gas is decreased. Desorbed $NO_x$ may then be reduced to $N_2$ with a suitable reductant (e.g. engine fuel) and promoted by a catalyst component, such as rhodium, of the $NO_x$ adsorber composition itself or located downstream of the $NO_x$ adsorber composition.

Modern $NO_x$ absorber catalysts coated on honeycomb flow-through monolith substrates are typically arranged in layered arrangements. However, multiple layers applied on a filter substrate can create backpressure problems. It is highly preferable, therefore, if the $NO_x$ absorber catalyst for use in the present invention is a "single layer" $NO_x$ absorber catalyst. Particularly preferred "single layer" $NO_x$ absorber catalysts comprise a first component of rhodium supported on a ceria-zirconia mixed oxide or an optionally stabilised alumina (e.g. stabilised with silica or lanthana or another rare earth element) in combination with second components which support platinum and/or palladium. The second components comprise platinum and/or palladium supported on an alumina-based high surface area support and a particulate "bulk" ceria ($CeO_2$) component, i.e. not a soluble ceria supported on a particulate support, but "bulk" ceria capable of supporting the Pt and/or Pd as such. The particulate ceria comprises a $NO_x$ absorber component and supports an alkaline earth metal and/or an alkali metal, preferably barium, in addition to the platinum and/or palladium. The alumina-based high surface area support can be magnesium aluminate e.g. $MgAl_2O_4$, for example.

The preferred "single layer" NAC composition comprises a mixture of the rhodium and platinum and/or palladium support components. These components can be prepared separately, i.e. pre-formed prior to combining them in a mixture, or rhodium, platinum and palladium salts and the supports and other components can be combined and the rhodium, platinum and palladium components hydrolysed preferentially to deposit onto the desired support.

Generally, a $NO_x$ adsorber composition comprises an alkali metal component, an alkaline earth metal component or a rare earth metal component or a combination of two or more components thereof, wherein the rare earth metal component comprises lanthanum or yttrium. It is preferred that the alkali metal component comprises potassium or sodium, more preferably potassium. It is preferred that the alkaline earth metal component comprises barium or strontium, more preferably barium.

The $NO_x$ adsorber composition may further comprise a support material and/or a catalytic metal component. The support material may be selected from alumina, ceria, titania, zirconia and mixtures thereof. The catalytic metal component may comprise a metal selected from platinum (Pt), palladium (Pd), rhodium (Rh) and combinations of two or more thereof.

Lean $NO_x$ catalysts (LNCs) are well known in the art. Preferred lean $NO_x$ catalysts (LNC) comprises either (a) platinum (Pt) supported on alumina or (b) a copper exchanged zeolite, particularly copper exchanged ZSM-5.

SCR catalysts are also well known in the art. When the exhaust system of the invention comprises an SCR catalyst, then the exhaust system may further comprise an injector for injecting a nitrogenous reductant, such as ammonia, or an ammonia precursor, such as urea or ammonium formate, preferably urea, into exhaust gas downstream of the catalyst for oxidising carbon monoxide (CO) and hydrocarbons (HCs) and upstream of the SCR catalyst. Such injector is fluidly linked to a source of such nitrogenous reductant precursor, e.g. a tank thereof, and valve-controlled dosing of the precursor into the exhaust stream is regulated by suitably programmed engine management means and closed loop or open loop feedback provided by sensors monitoring relevant exhaust gas composition. Ammonia can also be generated by heating ammonium carbamate (a solid) and the ammonia generated can be injected into the exhaust gas.

Alternatively or in addition to the injector, ammonia can be generated in situ e.g. during rich regeneration of a NAC disposed upstream of the filter or by contacting a DOC disposed upstream of the filter with engine-derived rich exhaust gas. Thus, the exhaust system may further comprise an engine management means for enriching the exhaust gas with hydrocarbons.

SCR catalysts for use in the present invention promote the reactions selectively $4NH_3+4NO+O_2 \rightarrow 4N_2+6H_2O$ (i.e. 1:1 $NH_3:NO_x$); $4NH_3+2NO+2NO_2 \rightarrow 4N_2+6H_2O$ (i.e. 1:1 $NH_3:NO_x$; and $8NH_3+6NO_2 \rightarrow 7N_2+12H_2O$ (i.e. 4:3 $NH_3:NO_x$) in preference to undesirable, non-selective side-reactions such as $2NH_3+2NO_2 \rightarrow N_2O+3H_2O+N_2$.

The SCR catalyst may comprise a metal selected from the group consisting of at least one of Cu, Hf, La, Au, In, V, lanthanides and Group VIII transition metals, such as Fe, which metal is supported on a refractory oxide or molecular sieve. Particularly preferred metals are Ce, Fe and Cu and combinations of any two or more thereof.

The refractory oxide may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$, $WO/CeZrO_2$, $WO/ZrO_2$ or $Fe/WO_x/ZrO_2$.

It is particularly preferred when an SCR catalyst or washcoat thereof comprises at least one molecular sieve, such as an aluminosilicate zeolite or a SAPO. The at least one molecular sieve can be a small, a medium or a large pore molecular sieve, for example. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts—see for example WO 2008/132452.

Preferred molecular sieves with application as SCR catalysts in the present invention are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

At its most basic, an ammonia slip catalyst (ASC) can be an oxidation catalyst for oxidising ammonia which slips past an upstream SCR or SCRF catalyst unreacted. The desired reaction (simplified) can be represented by $4NO+4NH_3+O_2 \rightarrow 4N_2+6H_2O$. Ammonia is a strong smelling compound and potential irritant to animal mucosal surfaces, e.g. eyes and respiratory pathways, and so its emission to atmosphere should be limited so far as possible. Possible ammonia slip catalysts include relatively low loaded platinum group metals, preferably including Pt e.g. 1-15 $g/ft^3$, on a suitable relatively high surface area oxide support, e.g. alumina coated on a suitable substrate monolith.

In a particularly preferred arrangement, however, the platinum group metal and the support material (e.g. comprising a modified alumina incorporating a heteroatom component) is disposed on a substrate (i.e. a substrate monolith) in a first layer below an upper, second layer overlying the first layer. The second layer is a SCR catalyst, selected from any of those mentioned hereinabove, particularly molecular sieves containing transition metals, such as Cu or Fe. A particularly preferred ASC in the layered arrangement comprises CuCHA in the second or upper layer.

In a first exhaust system embodiment, the exhaust system comprises the oxidation catalyst of the invention, preferably as a DOC, and a catalysed soot filter (CSF). Such an arrangement may be called a DOC/CSF. This embodiment also relates to the use of the oxidation catalyst for treating an exhaust gas from a compression ignition engine in combination with a catalysed soot filter, preferably wherein the oxidation catalyst is, or is for use as, a diesel oxidation catalyst. The oxidation catalyst is typically followed by (e.g. is upstream of) the catalysed soot filter (CSF). Thus, for example, an outlet of the oxidation catalyst is connected to an inlet of the catalysed soot filter.

The first exhaust system embodiment may further comprise a $NO_x$ adsorber catalyst (NAC). Thus, the embodiment further relates to the use of the oxidation catalyst for treating an exhaust gas from a compression ignition engine in combination with a $NO_x$ adsorber catalyst (NAC) and a catalysed soot filter (CSF), preferably wherein the oxidation catalyst is, or is for use as, a diesel oxidation catalyst. Typically the oxidation catalyst is followed by (e.g. is upstream of) the $NO_x$ adsorber catalyst (NAC), and the $NO_x$ adsorber catalyst (NAC) is followed by (e.g. is upstream of) the catalysed soot filter (CSF). Generally, the oxidation catalyst, the $NO_x$ adsorber catalyst (NAC) and the catalysed soot filter (CSF) are connected in series. Thus, for example, an outlet of the oxidation catalyst is connected to an inlet of the $NO_x$ adsorber catalyst (NAC), and an outlet of the $NO_x$ adsorber catalyst (NAC) is connected to an inlet of the catalysed soot filter (CSF). Such an arrangement may be termed a DOC/NAC/CSF.

In a second exhaust system embodiment, the exhaust system comprises a diesel oxidation catalyst and the oxidation catalyst of the invention, preferably as a catalysed soot filter (CSF). This arrangement may also be called a DOC/CSF arrangement. The embodiment further relates to the use of the oxidation catalyst for treating an exhaust gas from a compression ignition engine in combination with a diesel oxidation catalyst (DOC), preferably wherein the oxidation catalyst is, or is for use as, a catalysed soot filter. Typically, the diesel oxidation catalyst (DOC) is followed by (e.g. is upstream of) the oxidation catalyst of the invention. Thus, an outlet of the diesel oxidation catalyst is connected to an inlet of the oxidation catalyst of the invention.

A third exhaust system embodiment relates to an exhaust system comprising the oxidation catalyst of the invention, preferably as a DOC, a catalysed soot filter (CSF) and a selective catalytic reduction (SCR) catalyst. Such an arrangement may be called a DOC/CSF/SCR and is a preferred exhaust system for a light-duty diesel vehicle. This embodiment also relates to the use of the oxidation catalyst for treating an exhaust gas from a compression ignition engine in combination with a catalysed soot filter (CSF) and a selective catalytic reduction (SCR) catalyst, preferably wherein the oxidation catalyst is, or is for use as, a diesel oxidation catalyst. The oxidation catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

A fourth exhaust system embodiment relates to an exhaust system comprising a diesel oxidation catalyst (DOC), the oxidation catalyst of the invention, preferably as a catalysed soot filter (CSF), and a selective catalytic reduction (SCR) catalyst. This is also a DOC/CSF/SCR arrangement. A further aspect of this embodiment relates to the use of the oxidation catalyst for treating an exhaust gas from a compression ignition engine in combination with a diesel oxidation catalyst (DOC) and a selective catalytic reduction (SCR) catalyst, preferably wherein the oxidation catalyst is, or is for use as, a catalysed soot filter (CSF). The diesel oxidation catalyst (DOC) is typically followed by (e.g. is upstream of) the oxidation catalyst of the invention. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

In a fifth exhaust system embodiment, the exhaust system comprises the oxidation catalyst of the invention, preferably as a DOC, a selective catalytic reduction (SCR) catalyst and either a catalysed soot filter (CSF) or a diesel particulate filter (DPF). The arrangement is either a DOC/SCR/CSF or a DOC/SCR/DPF. This embodiment also relates to the use of the oxidation catalyst for treating an exhaust gas from a compression ignition engine in combination with a selective catalytic reduction (SCR) catalyst and either a catalysed soot filter (CSF) or a diesel particulate filter (DPF), preferably wherein the oxidation catalyst is, or is for use as, a diesel oxidation catalyst.

In the fifth exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A sixth exhaust system embodiment comprises the oxidation catalyst of the invention, preferably as a DOC, and a selective catalytic reduction filter (SCRF) catalyst. Such an arrangement may be called a DOC/SCRF. This embodiment also relates to the use of the oxidation catalyst for treating an exhaust gas from a compression ignition engine in combination with a selective catalytic reduction filter (SCRF) catalyst, preferably wherein the oxidation catalyst is, or is for use as, a diesel oxidation catalyst. The oxidation catalyst of the invention is typically followed by (e.g. is upstream of) the selective catalytic reduction filter (SCRF) catalyst. A nitrogenous reductant injector may be arranged between the oxidation catalyst and the selective catalytic reduction filter (SCRF) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF) catalyst.

In a seventh exhaust system embodiment, the exhaust system comprises a $NO_x$ adsorber catalyst (NAC) and the oxidation catalyst of the invention, preferably as a catalysed soot filter (CSF). This arrangement may also be called a NAC/CSF arrangement. The embodiment further relates to the use of the oxidation catalyst for treating an exhaust gas from a compression ignition engine in combination with a $NO_x$ adsorber catalyst (NAC), preferably wherein the oxidation catalyst is, or is for use as, a catalysed soot filter. Typically, the catalysed soot filter (CSF) is downstream of the $NO_x$ adsorber catalyst (NAC). Thus, an outlet of the $NO_x$ adsorber catalyst (NAC) is connected to an inlet of the oxidation catalyst of the invention.

The seventh exhaust system embodiment may further comprise a selective catalytic reduction (SCR) catalyst. Thus, the embodiment further relates to the use of the oxidation catalyst for treating an exhaust gas from a compression ignition engine in combination with a $NO_x$ adsorber catalyst (NAC) and a selective catalytic reduction (SCR) catalyst, preferably wherein the oxidation catalyst is, or is for use as, a catalysed soot filter (CSF). Typically the $NO_x$ adsorber catalyst (NAC) is followed by (e.g. is upstream of) the oxidation catalyst of the invention, and the oxidation catalyst of the invention is followed by (e.g. is upstream of) the selective catalytic reduction (SCR) catalyst. Such an arrangement may be termed a NAC/CSF/SCR. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. Alternatively, or additionally to the nitrogenous reductant injector, ammonia can be generated in situ e.g. during rich regeneration of a NAC disposed upstream of the filter.

In the seventh exhaust system embodiment with an SCR catalyst, the $NO_x$ adsorber catalyst (NAC), the oxidation catalyst and the selective catalytic reduction (SCR) catalyst are generally connected in series with an optional nitrogenous reductant injector being connected between the oxidation catalyst and the selective catalytic reduction (SCR) catalyst. Thus, for example, an outlet of the $NO_x$ adsorber catalyst (NAC) is connected to an inlet of the oxidation catalyst, and outlet of the oxidation catalyst is connected to an inlet of the selective catalytic reduction (SCR) catalyst.

In any of the first through seventh inclusive exhaust system embodiments described hereinabove containing a SCR catalyst (including SCRF catalyst), an ASC catalyst can be disposed downstream from the SCR catalyst or the SCRF catalyst (i.e. as a separate substrate monolith), or more preferably a zone on a downstream or trailing end of the substrate monolith comprising the SCR catalyst can be used as a support for the ASC.

A second aspect of the invention relates to a vehicle comprising a compression ignition engine and the exhaust system for the compression ignition engine.

The invention also provides a compression ignition engine comprising an exhaust system of the invention.

The compression ignition engine can be a homogenous charge compression ignition (HCCI) engine or a premixed charge compression ignition engine (PCCI) (see DieselNet Technology Guide "Engine Design for Low Emissions", Revision 2010.12a) or more conventional Port Fuel injected-type compression ignition engines.

Generally, the compression ignition engine is a diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

The fourth aspect of the invention relates to a method of treating an exhaust gas from a compression ignition engine, which method comprises contacting the exhaust gas with an oxidation catalyst, wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component; and a substrate, wherein the platinum group metal (PGM) component, the alkaline earth metal component and the support material are disposed on the substrate.

Typically, the method involves contacting the exhaust gas directly from the compression ignition engine with the oxidation catalyst. Thus, it is preferred that additional hydrocarbon (HC) is generally not injected into the exhaust gas prior to contacting the exhaust gas with the oxidation catalyst. The amount of hydrocarbon in the exhaust gas is preferably less than 1,000 ppm by volume, as converted to methane, more preferably less than 950 ppm by volume, still more preferably less than 750 ppm, typically before contacting the exhaust gas with the oxidation catalyst.

A fifth aspect of the invention relates to a process of preparing the oxidation catalyst. The invention also relates to an oxidation catalyst obtained or obtainable by the process. The process comprises disposing a platinum group metal (PGM) component, an alkaline earth metal component, and a support material onto a substrate, wherein the platinum group metal (PGM) component is selected from the group consisting of a platinum (Pt) component, a palladium (Pd) component and a combination thereof, and the support material comprises a modified alumina incorporating a heteroatom component.

Each layer/zone of the catalyst may be formed on the substrate by applying a washcoat coating to the substrate. Generally, each washcoat coating is an aqueous dispersion that includes each of the components that make up the relevant layer of the catalyst. The components that make-up the washcoat coating can be pre-formed.

Typically, the step of disposing a platinum group metal (PGM) component, an alkaline earth metal component, and a support material onto a substrate involves applying a washcoat coating to the substrate to form a coated substrate. When the oxidation catalyst comprises a plurality of layers, then the process involves applying a plurality of washcoat coatings onto the substrate to form a plurality of layers. After applying the or each washcoat coating, or after applying the plurality of washcoat coatings, a step of calcining the coated substrate at temperature of 400 to 800° C., preferably 450 to 600° C., is generally performed.

For an oxidation catalyst comprising two layers, the step of disposing a platinum group metal (PGM) component, an alkaline earth metal component, and a support material onto a substrate involves applying a first washcoat coating to the substrate for forming a first layer, then applying a second washcoat coating to the substrate for forming a second layer. After applying at least the first washcoat coating, preferably after applying the first washcoat coating and the second washcoat coating, a coated substrate is obtained. The process then involves a step of calcining the coated substrate at temperature of 400 to 800° C., preferably 450 to 600° C., is typically performed. The first and second coatings form the first and second layers of the catalyst respectively.

Typically, each washcoat coating may independently comprise an aqueous dispersion of a platinum group metal (PGM) salt, a support material and optionally an alkaline earth metal salt. During calcination, the platinum group metal (PGM) salt forms the platinum group metal (PGM) component and the alkaline earth metal salt forms the alkaline earth metal component.

Suitable platinum group metal (PGM) salts are well known in the art and include, for example, platinum nitrate and palladium nitrate. Examples of suitable alkaline earth metal salts include an alkaline earth metal nitrate and an alkaline earth metal acetate. The amount and identity of each salt that is used is determined by the desired composition of the layer that is to be formed.

The support material is selected from the group consisting of a second support material as defined above, the support material comprising the modified alumina and a combination thereof. It is preferred that the support material is the support material comprising the modified alumina.

Each washcoat coating may optionally further comprise a noble metal salt and/or an oxygen storage material and/or a hydrocarbon adsorbent. It is preferred that at least one, or each, washcoat coating further comprises a hydrocarbon adsorbent.

A first embodiment of the process of preparing the oxidation catalyst comprises: applying a washcoat coating to a substrate to form a coated substrate, wherein the washcoat coating comprises a platinum group metal (PGM) salt, an alkaline earth metal salt, a support material comprising the modified alumina and optionally a hydrocarbon adsorbent and/or an oxygen storage material and/or a noble metal salt;

and calcining the coated substrate at a temperature of 400 to 800° C., preferably 450 to 600° C.

A second embodiment of the process of preparing the oxidation catalyst comprises: applying a first washcoat coating onto a substrate to form a first coating; applying a second washcoat coating onto the substrate; and calcining the substrate, after applying the first coating and/or the second coating, at a temperature of 400 to 800° C., preferably 450 to 600° C.

Typically, the first washcoat coating comprises a platinum group metal (PGM) salt, an alkaline earth metal salt, a support material and optionally a hydrocarbon adsorbent and/or an oxygen storage material and/or a noble metal salt and/or a second storage material. The composition of the first washcoat coating being selected to form a first layer as defined above. The second washcoat coating comprises a platinum group metal (PGM) salt, an alkaline earth metal salt, a support material and optionally a hydrocarbon adsorbent and/or an oxygen storage material and/or a noble metal salt and/or a second storage material. The composition of the second washcoat coating being selected to form a second layer as defined above.

There are several methods of preparing a washcoat coating and often the method used is determined by the catalyst layer that is intended to be formed.

One way of preparing the washcoat coating, preferably the first washcoat coating and/or the second washcoat coating, is by dispersing a platinum group metal (PGM) salt, an alkaline earth metal salt, a support material and optionally a hydrocarbon adsorbent and/or an oxygen storage material and/or a noble metal salt and/or a second storage material in an aqueous solution.

Another way of preparing the washcoat coating, preferably the first washcoat coating and/or the second washcoat coating, is by impregnating the support material with either an alkaline earth metal salt or an alkaline earth metal component to form an impregnated support material, and then dispersing the impregnated support material, a platinum group metal (PGM) salt, and optionally a hydrocarbon adsorbent and/or an oxygen storage material and/or a noble metal salt and/or a second storage material in an aqueous solution. The step of impregnating the support material may involve either (a) spray drying an alkaline earth metal salt or an alkaline earth metal component onto the support material or (b) dissolving an alkaline earth metal salt in an aqueous solution, and then adding the support material to form a solution comprising the support material and the alkaline earth metal salt. After adding the support material in step (b), the solution comprising the support material and the alkaline earth metal salt is stirred and, preferably, the pH of the solution is adjusted to precipitate an alkaline earth metal salt or component.

A further way of preparing the washcoat coating, preferably the first washcoat coating and/or the second washcoat coating, is by impregnating the support material with either a platinum group metal (PGM) salt to form a PGM impregnated support material, and then dispersing the PGM impregnated support material, an alkaline earth metal salt, and optionally a hydrocarbon adsorbent and/or an oxygen storage material and/or a noble metal salt and/or a second storage material in an aqueous solution. Methods for impregnating alumina support materials with a PGM are well known in the art.

Definitions

For the avoidance of doubt, the term "modified alumina incorporating a heteroatom component" does not embrace "pure" alumina (i.e. alumina having a purity of ≥99.9%), a mixture of alumina and the heteroatom component, such as a mixture of silica and alumina, or a zeolite. In the context of the "modified alumina incorporating a heteroatom component", any amount in % by weight refers to the amount of heteroatom component, whether an element, ion or a compound, that is present in the host lattice of alumina with the remainder consisting essentially of alumina.

The term "alumina doped with a heteroatom component" generally refers to a material comprising a host lattice of alumina that is substitution doped or interstitially doped with a heteroatom component. In some instances, small amounts of the heteroatom component may be present (i.e. as a dopant) at a surface of the alumina. However, most of the dopant will generally be present in the body of the host lattice of the alumina. Alumina doped with a heteroatom component is generally commercially available, or can be prepared by conventional methods that are well known in the art or by using a method as described in U.S. Pat. No. 5,045,519.

The term "alkaline earth metal component" as used herein generally refers to an element or ion from Group 2 of the Periodic Table, a compound comprising an element or ion from Group 2 of the Periodic Table, or a metal alloy comprising an element from Group 2 of the Periodic Table, unless otherwise specified. The term "alkaline earth metal component" typically does not comprise or include the "modified alumina incorporating a heteroatom component". The "alkaline earth metal component" is not an "alumina doped with a heteroatom component" or an "alkaline earth metal aluminate" as described herein.

Generally, the "alkaline earth metal component" is (i) a compound comprising an alkaline earth metal, and/or (ii) a metal alloy comprising an alkaline earth metal. In the compound comprising an alkaline earth metal, the alkaline earth metal is typically present as a cation. The compound may, for example, be an alkaline earth metal oxide, an alkaline earth metal nitrate, an alkaline earth metal carbonate, or an alkaline earth metal hydroxide. In the metal alloy, the alkaline earth metal is typically present in elemental form (i.e. as a metal). The alkaline earth metal component is preferably a compound comprising an alkaline earth metal, more preferably a compound comprising a single alkaline earth metal.

The term "platinum group metal (PGM)" as used herein generally refers to platinum or palladium, unless otherwise specified. For the avoidance of doubt, this term does not, in general, include rhodium.

The term "platinum group metal (PGM) component" as used herein refers to any moiety that comprises a platinum group metal (PGM), such as elemental PGM (e.g. a PGM metal), a PGM ion (e.g. a cation, such as $Pt^{2+}$), a compound comprising a PGM (e.g. a PGM salt or an oxide of a PGM) or an alloy comprising a PGM (e.g. a platinum-palladium alloy). The term "platinum (Pt) component" as used herein refers to any moiety that comprises platinum, such as elemental platinum (e.g. platinum metal), a platinum ion (e.g. a cation, such as $Pt^{2+}$), a compound of platinum (e.g. a platinum salt or an oxide of platinum) or an alloy comprising platinum (e.g. a platinum-palladium alloy). The term "palladium (Pd) component" as used herein refers to any moiety that comprises palladium, such as elemental palladium (e.g. palladium metal), a palladium ion (e.g. a cation, such as $Pd^{2+}$), a compound of palladium (e.g. a palladium salt or an oxide of palladium) or an alloy comprising palladium (e.g. a platinum-palladium alloy).

The "platinum (Pt) component" is typically platinum metal or an alloy comprising platinum, particularly a platinum-palladium alloy. Preferably, the "platinum (Pt) component" is platinum metal.

The "palladium (Pd) component" is typically palladium metal, palladium oxide or an alloy comprising palladium, particularly a platinum-palladium alloy. Preferably, the "palladium (Pd) component" is palladium metal.

The term "noble metal component" as used herein refers to any moiety that comprises a noble metal, such as an elemental form of the noble metal, an ion of the noble metal, a compound of the noble metal or an alloy comprising the noble metal (e.g. a noble metal-platinum alloy or a noble metal-palladium alloy). It is preferred that the "noble metal component" is a noble metal itself (i.e. in elemental form) or an alloy comprising the noble metal. More preferably, the "noble metal component" is the noble metal itself (i.e. in elemental form).

Any reference to an amount of the "platinum group metal (PGM) component", "platinum (Pt) component", "palladium (Pd) component", "alkaline earth metal component" or the "noble metal component" as used herein generally refers to the amount of, respectively, PGM, platinum, palladium, alkaline earth metal or noble metal that is present. Thus, for example, if the "platinum group metal (PGM) component", "platinum (Pt) component", "palladium (Pd) component", "alkaline earth metal component" or the "noble metal component" is a compound comprising, respectively, a PGM, platinum, palladium, an alkaline earth metal or a noble metal, then the stated amount refers only to the total amount of the said metal that is present and does not include the other components of the compound.

Amounts given in units of g ft$^{-3}$ or g in$^{-3}$ generally relate to the volume of the substrate that is used.

Any reference to an amount of a material in terms of % by weight, such as for the amount of alkaline earth metal component, typically refers to a percentage of the overall weight of the layer/zone (e.g. washcoat coating) comprising that material.

The term "substantially cover" as used herein refers to at least 90% coverage, preferably at least 95% coverage, more preferably at least 99% coverage, of the surface area of the first layer by the second layer.

The term "substantially uniform length" as used herein refers to the length of layer that does not deviate by more than 10%, preferably does not deviate by more than 5%, more preferably does not deviate by more than 1%, from the mean value of the length of the layer.

The expression "consisting essentially" as used herein limits the scope of a feature to include the specified materials or steps, and any other materials or steps that do not materially affect the basic characteristics of that feature, such as for example minor impurities. The expression "consisting essentially of" embraces the expression "consisting of".

The term "zone" as used herein refers to a washcoat region or layer having a length that is less than the total length of the substrate. In general, the "zone" has a substantially uniform length. The term normally refers to the side-by-side arrangement of two or more washcoat regions or layers on the same substrate.

EXAMPLES

The invention will now be illustrated by the following non-limiting examples.

Example 1

Preparative Methods

Samples containing an alkaline earth metal component and alumina doped with a heteroatom component as a support material were prepared as follows.

Silica doped alumina powder was slurried in water and milled to a $d_{90}$<20 micron. Barium acetate was added to the slurry followed by appropriate amounts of soluble platinum and palladium salts. The slurry was then stirred to homogenise. The resulting washcoat was applied to a cordierite flow through monolith having 400 cells per square inch using established coating techniques. The part was dried and calcined at 500° C.

For comparative purposes, samples containing alumina doped with a heteroatom component as a support material, but without the alkaline earth metal component were also prepared. The method above was used to prepare the samples except that the step of adding barium acetate was omitted.

As a further comparison, samples containing conventional alumina as a support material with and without the alkaline earth metal component were prepared as follows.

Alumina powder was slurried in water and milled to a $d_{90}$<20 micron. Barium acetate was added to the slurry followed by appropriate amounts of soluble platinum and palladium salts. The slurry was then stirred to homogenise. The resulting washcoat was applied to a cordierite flow through monolith having 400 cells per square inch using established coating techniques. The part was dried and calcined at 500° C.

Analogous alumina samples without the alkali earth metal component were prepared by omitting the barium acetate addition step.

The formulations contained a total loading of 50 gft$^{-3}$ of platinum group metal. The samples containing barium were prepared using a loading of 150 gft$^{-3}$. Alumina doped with 5% silica was used as the modified alumina.

Measurement of CO $T_{50}$

The catalytic activity was determined using a synthetic gas bench activity test (SCAT). Parts to be tested were first cored using a core drill and aged in an oven at 750° C. for 5 hours using hydrothermal conditions (10% water). The aged cores were tested in a simulated catalyst activity testing (SCAT) gas apparatus using the inlet gas mixtures in Table 1. In each case the balance is nitrogen.

TABLE 1

| | |
|---|---|
| CO | 1500 ppm |
| HC (as $C_1$) | 430 ppm |
| NO | 100 ppm |
| $CO_2$ | 4% |
| $H_2O$ | 4% |
| $O_2$ | 14% |
| Space velocity | 55000/hour |

Results

The results of the measurements are shown in FIG. 1. FIG. 1 shows the improved activity of catalysts of the invention, which comprise both a modified alumina and barium at a loading of 150 gft$^{-3}$. The catalysts of the invention have a lower CO $T_{50}$ light off temperature than the comparative catalysts that do not contain barium. This is particularly apparent when the ratio by mass of Pt:Pd is in the range of 1:2 to 2:1. The catalysts containing conventional alumina as a support material and barium do not show an improved CO $T_{50}$ light off temperature compared to catalysts containing conventional alumina and no barium.

Example 2

Samples containing alumina doped with 5% silica, Pt:Pd in a mass ratio of 1:1 at a total PGM loading of 50 gft$^{-3}$ and varying amounts of barium were prepared using the method described above. The CO $T_{50}$ light off temperatures were also measured using the same procedure as set out above.
Results
The results of the CO "light-off" measurements are shown in Table 2 below.

TABLE 2

| Sample No. | Amount of Ba (gft$^{-3}$) | CO $T_{50}$ (° C.) |
|---|---|---|
| 2-1 | 0 | 186 |
| 2-2 | 150 | 170 |
| 2-3 | 300 | 166 |

Example 3

Preparative Method

Silica doped alumina powder was slurried in water and milled to a $d_{90}$<20 micron. Strontium acetate was added to the slurry followed by appropriate amounts of soluble platinum and palladium salts. The mass ratio of Pt:Pd was 1:1 at a total PGM loading of 50 gft$^{-3}$. The slurry was then stirred to homogenise. The resulting washcoat was applied to a cordierite flow through monolith having 400 cells per square inch using established coating techniques. The part was dried and calcined at 500° C. The CO $T_{50}$ light off temperatures were also measured using the same procedure as set out above.
Results
The results of the CO "light-off" measurements are shown in Table 3 below.

TABLE 3

| Sample No. | Alkaline Earth Metal (AEM) | Amount of AEM (gft$^{-3}$) | Support | CO $T_{50}$ (° C.) |
|---|---|---|---|---|
| 3-1 | Ba | 100 | A1 | 164 |
| 3-2 | Ba | 150 | A2 | 166 |
| 3-3 | Sr | 150 | A1 | 178 |
| 3-4 | Sr | 300 | A1 | 176 |

Catalysts containing strontium show a lower CO $T_{50}$ light off than a comparative catalyst without strontium (see Sample 2-1 in Table 2). Samples 3-1 and 3-2 show that a reduction in CO $T_{50}$ light off is achieved using two different hetero-atom doped aluminas. Support A1 is a 5% silica doped alumina and support A2 is a 10% silica doped alumina.

Example 4

Preparative Method

Magnesium doped alumina powder was slurried in water and milled to a $d_{90}$<20 micron. Barium acetate was added to the slurry followed by appropriate amounts of soluble platinum and palladium salts. The mass ratio of Pt:Pd was 2:1 at a total PGM loading of 50 gft$^{-3}$. The slurry was then stirred to homogenise. The resulting washcoat was applied to a cordierite flow through monolith having 400 cells per square inch using established coating techniques. The part was dried and calcined at 500° C.

For comparative purposes, catalysts containing magnesium doped alumina as a support material without an alkali earth metal were prepared in the same way, except that the barium acetate addition step was omitted.

The CO $T_{50}$ light off temperatures were also measured using the procedure set out above.
Results
The results of the CO "light-off" measurements are shown in Table 4 below.

TABLE 4

| Sample No. | Amount of Ba (gft$^{-3}$) | Support | CO $T_{50}$ (° C.) |
|---|---|---|---|
| 4-1 | 0 | A1 | 177 |
| 4-2 | 130 | A1 | 170 |
| 4-3 | 0 | A3 | 193 |
| 4-4 | 130 | A3 | 174 |

A3=Magnesium aluminate having 20% by weight magnesium.

The samples containing a support material comprising magnesium aluminate show a lower CO $T_{50}$ light off when barium is included in the formulation than those sample prepared without barium. The light off temperature is reduced by 19° C.

Example 5

Preparative Method

A catalyst (5-1) was prepared via incipient wetness impregnation of barium acetate solution on to a silica doped alumina support. The material was dried at 105° C. A second solution of platinum and palladium salts was then added by incipient wetness impregnation. The resulting material was dried at 105° C. then calcined at 500° C. The final composition was 0.65 wt % Pt, 0.35 wt % Pd and 10 wt % Ba.

A comparative catalyst (5-2) was prepared using the same method but without the barium acetate impregnation on to the silica doped alumina support. The final composition was 0.65 wt % Pt and 0.35 wt % Pd.

The % NO oxidation activity against temperature of each catalyst was tested when the catalyst was freshly prepared (e.g. "fresh" catalyst) and after hydrothermal ageing each catalyst at 750° C. for 48 hours (e.g. "aged" catalyst). The test gas mix is given in Table 5. In each case the balance is nitrogen.

TABLE 5

| CO | 1500 ppm |
|---|---|
| HC (as $C_1$) | 783 ppm |
| NO | 100 ppm |
| $CO_2$ | 5% |
| $H_2O$ | 5% |
| $O_2$ | 14% |

Results
The difference between the activity of the "fresh" and the "aged" versions of each catalyst is shown in Table 6 below.

TABLE 6

| Sample No. | Difference in % NO oxidation between "fresh" and "aged" | |
|---|---|---|
| | 210° C. | 270° C. |
| 5-1 | 3% | 4% |
| 5-2 | 21% | 23% |

The results in Table 6 show that catalyst 5-1 has a smaller difference in % NO oxidation performance between "fresh" and "aged" than catalyst 5-2. This difference is important for exhaust system where there is a downstream emissions control device, particularly a SCR or SCRF catalyst, because the activity of such downstream emissions control devices may be affected by the $NO_x$ content of the exhaust gas, especially the $NO:NO_2$ ratio.

For the avoidance of any doubt, the entire content of any and all documents cited herein is incorporated by reference into the present application.

The invention claimed is:

1. An exhaust system for a compression ignition engine comprising an oxidation catalyst for treating carbon monoxide (CO) and hydrocarbons (HCs) in exhaust gas from the compression ignition engine, wherein the oxidation catalyst comprises:
   a platinum group metal (PGM) component that is a platinum (Pt) component, a palladium (Pd) component, or a combination thereof;
   an alkaline earth metal component;
   a support material comprising a modified alumina incorporating a heteroatom component; and
   a substrate; and
   wherein the platinum group metal (PGM) component, the alkaline earth metal component and the support material are disposed on the substrate.

2. The exhaust system according to claim 1, wherein the modified alumina incorporating a heteroatom component is an alumina doped with a heteroatom component, an alkaline earth metal aluminate or a mixture thereof.

3. The exhaust system according to claim 2, wherein the heteroatom component comprises silicon, magnesium, barium, lanthanum, cerium, titanium, zirconium or a combination of two or more thereof.

4. The exhaust system according to claim 1, wherein the modified alumina incorporating a heteroatom component is alumina doped with silica.

5. The exhaust system according to claim 4, wherein the alumina is doped with silica in an amount of 0.5 to 45% by weight.

6. The exhaust system according to claim 1, wherein the modified alumina incorporating a heteroatom component is an alkaline earth metal aluminate.

7. The exhaust system according to claim 6, wherein the alkaline earth metal aluminate is magnesium aluminate.

8. The exhaust system according to claim 1, wherein the alkaline earth metal component comprises magnesium (Mg), calcium (Ca), strontium (Sr), barium (Ba) or a combination of two or more thereof.

9. The exhaust system according to claim 8, wherein the alkaline earth metal component comprises strontium (Sr) or barium (Ba).

10. The exhaust system according to claim 1, wherein the oxidation catalyst comprises a single layer disposed on the substrate, wherein the single layer comprises the platinum group metal (PGM) component that is a platinum (Pt) component, a palladium (Pd) component, or a combination thereof; the alkaline earth metal component; and the support material.

11. The exhaust system according to claim 1, wherein the oxidation catalyst comprises two layers, wherein a first layer is disposed on the substrate and a second layer is disposed on the first layer.

12. The exhaust system according to claim 11, wherein the first layer comprises a platinum group metal (PGM) component that is a combination of a platinum (Pt) component and a palladium (Pd) component, and the second layer comprises a platinum group metal (PGM) component that is a combination of a palladium (Pd) component and a platinum (Pt) component, and wherein the ratio by mass of the platinum (Pt) component to the palladium (Pd) component in the first layer is different to the ratio by mass of the platinum (Pt) component to the palladium (Pd) component in the second layer.

13. The exhaust system according to claim 11, wherein the first layer comprises a platinum group metal (PGM) component is a Pd component or a combination of a palladium (Pd) component, or a platinum (Pt) component, and wherein the second layer comprises a Pt component.

14. The exhaust system according to claim 11, wherein the first layer comprises a platinum group metal (PGM) component that is a platinum (Pt) component or a combination of a palladium (Pd) component and a platinum (Pt) component, and the second layer comprises a platinum group metal (PGM) component that is a palladium (Pd) component.

15. The exhaust system according to claim 11, wherein the first layer comprises a platinum group (PGM) component that is a platinum (Pt) component or a palladium (Pd) component, and the second layer comprises a platinum group metal (PGM) component that is a combination of a palladium (Pd) component and a platinum (Pt) component.

16. The exhaust system according to claim 1, wherein the total amount of the alkaline earth metal component is 10 to 500 $gft^{-3}$.

17. A vehicle comprising a compression ignition engine and the exhaust system according to claim 1.

18. A process of preparing an oxidation catalyst of claim 1, comprising disposing a platinum group metal (PGM) component, an alkaline earth metal component, and a support material onto a substrate, wherein the platinum group metal (PGM) component is a platinum (Pt) component, a palladium (Pd) component, or a combination thereof, and the support material comprises a modified alumina incorporating a heteroatom component.

19. A method of treating carbon monoxide (CO) and hydrocarbons (HCs) in an exhaust gas from a compression ignition engine, which method comprises contacting the exhaust gas with an oxidation catalyst, wherein the oxidation catalyst comprises:
   a platinum group metal (PGM) component that is a platinum (Pt) component, a palladium (Pd) component, or a combination thereof;
   an alkaline earth metal component;
   a support material comprising a modified alumina incorporating a heteroatom component; and
   a substrate; and
   wherein the platinum group metal (PGM) component, the alkaline earth metal component and the support material are disposed on the substrate.

20. The method according to claim 19, wherein the total amount of the alkaline earth metal component is 10 to 500 g $ft^{-3}$.

* * * * *